(12) United States Patent
Tonkovich et al.

(10) Patent No.: US 7,883,670 B2
(45) Date of Patent: Feb. 8, 2011

(54) METHODS OF MAKING DEVICES BY STACKING SHEETS AND PROCESSES OF CONDUCTING UNIT OPERATIONS USING SUCH DEVICES

(75) Inventors: Anna Lee Tonkovich, Marysville, OH (US); Gary Roberts, West Richland, WA (US); Sean P. Fitzgerald, Columbus, OH (US); Paul W Neagle, Westerville, OH (US); Dongming Qiu, Dublin, OH (US); Matthew Schmidt, Columbus, OH (US)

(73) Assignee: Battelle Memorial Institute, Richland, WA (US)

( * ) Notice: Subject to any disclaimer, the term of this patent is extended or adjusted under 35 U.S.C. 154(b) by 715 days.

(21) Appl. No.: 10/076,915

(22) Filed: Feb. 14, 2002

(65) Prior Publication Data

US 2003/0152488 A1    Aug. 14, 2003

(51) Int. Cl.
B01J 8/02      (2006.01)
B01J 19/24     (2006.01)

(52) U.S. Cl. .................. 422/129; 422/130; 422/198; 422/211; 203/86; 29/890; 29/890.03; 29/890.07

(58) Field of Classification Search .............. None
See application file for complete search history.

(56) References Cited

U.S. PATENT DOCUMENTS 2,209,346 A * 7/1940 McCausland ............ 208/146
3,382,534 A    5/1968 Veazy
3,712,595 A * 1/1973 Hirsch .................. 261/114.1
3,881,701 A * 5/1975 Schoenman et al. ....... 239/403
4,514,095 A    4/1985 Ehrfeld et al. ............ 366/340
4,516,632 A    5/1985 Swift et al. ............... 165/167
4,806,295 A * 2/1989 Trickett et al. .......... 156/89.22
4,898,233 A    2/1990 Grehier et al. ........... 165/166
4,928,755 A    5/1990 Doty et al. ............... 165/168

(Continued)

FOREIGN PATENT DOCUMENTS

DE    19927556 A1    12/2000

(Continued)

OTHER PUBLICATIONS

Haswell et al: Chemical and biochemical microreactors. Trends in Analytical Chemistry, vol. 19, No. 6, 2000. pp. 389-395.*

(Continued)

*Primary Examiner*—Jennifer A Leung
(74) *Attorney, Agent, or Firm*—Derek H. Maughan; Frank Rosenberg

(57) ABSTRACT

New designs, methods and processes are described that in which laminated devices and configured in a style named the "ortho" style. To form a device in the ortho style, plates or sheets are machined to have apertures and then stacked together such that the apertures connect and fluid can flow through the device in a direction that is substantially parallel to the direction of sheet thickness. Various laminated devices and processes using them are also described. For example, devices in which non-rectangular microchannels conform around reaction chambers or other bodies that need to be heated or cooled, are described. Features that separate or trip boundary layer and enhance heat transfer are also described.

17 Claims, 28 Drawing Sheets

U.S. PATENT DOCUMENTS

| | | | | |
|---|---|---|---|---|
| 5,016,707 | A | 5/1991 | Nguyen | 165/167 |
| 5,020,586 | A | 6/1991 | Mansingh | 165/80.3 |
| 5,199,487 | A | 4/1993 | DiFrancesco et al. | 165/168 |
| 5,212,004 | A * | 5/1993 | Bottcher et al. | 428/131 |
| 5,453,641 | A | 9/1995 | Mundinger et al. | 257/714 |
| 5,534,328 | A | 7/1996 | Ashmead et al. | 428/166 |
| 5,657,818 | A * | 8/1997 | Bottcher et al. | 165/167 |
| 5,692,558 | A | 12/1997 | Hamilton et al. | 165/80.4 |
| 5,718,286 | A | 2/1998 | Damsohn et al. | 165/167 |
| 5,727,618 | A | 3/1998 | Mundinger et al. | 165/80.4 |
| 5,836,383 | A | 11/1998 | Zwittig | 165/167 |
| 6,096,286 | A * | 8/2000 | Autenrieth | 423/651 |
| 6,129,973 | A | 10/2000 | Martin et al. | 428/166 |
| 6,187,273 | B1 * | 2/2001 | Gaiser | 422/173 |
| 6,192,596 | B1 * | 2/2001 | Bennett et al. | 34/76 |
| 6,572,830 | B1 | 6/2003 | Burdon et al. | |
| 2003/0039169 | A1 | 2/2003 | Ehrfeld | 366/336 |

FOREIGN PATENT DOCUMENTS

| | | |
|---|---|---|
| EP | 0 754 492 A2 | 1/1997 |
| EP | 1120164 A2 | 8/2001 |
| EP | 1123734 A | 8/2001 |
| EP | 1474237 | 11/2005 |
| JP | 8178557 | 7/1996 |
| JP | 2000329490 A * | 11/2000 |
| WO | WO 99/65704 | 12/1999 |
| WO | WO 0021659 A1 * | 4/2000 |
| WO | WO 0034728 A1 * | 6/2000 |
| WO | WO 01/10773 A1 | 2/2001 |
| WO | WO 0135043 A1 * | 5/2001 |
| WO | WO 03/022417 A2 | 3/2003 |

OTHER PUBLICATIONS

Partial Condenser. Retrieved from http://www.chemeng.ed.ac.uk/~jwp/headstart/separation/pcon.html on Nov. 20, 2009.*

Ehrenfel et al., "Microreactors, New Technology for Modern Chemistry," Wiley, pp. 30-32, 35-39, 64-73, 83-85, 102-105, 112-114.

International Search Report for PCT/US03/02681, mailed Jun. 4, 2003.

European Search Report for EP 05020644.0- 2113, mailed Dec. 2, 2005.

Ehrfeld et al., "Implementation of microreaction technology in process engineering and biochemistry," Microtechnology: industrial prospects; proceedings of the Third Int'l Conference on Microreaction Technology/IMRET 3, Springer, 2000.

English Translation of Opposition to EP 1474237B1.

Interlocutory Decision from European Patent Office Regarding Opposition to European Patent EP 1,474,237B1, Nov. 30, 2007.

Minutes from Hearing, European Patent Office Regarding Opposition to European Patent EP 1,474,237B1, 2007.

Main and Auxillary Requests submitted to European Patent Office Regarding Opposition to European Patent EP 1,474,237B1, 2007.

Revisions to EP 1,474,237B1, resulting from Interlocutory Decision from European Patent Office Regarding Opposition to European Patent EP 1,474,237B1, 2007.

Letter of Opponent, IMM, in Opposition to European Patent EP 1,474,237B1, Oct. 10, 2008. English Translation.

Communication from European Patent Office in European Patent Application No. 05020644.0-2113, mailed Mar. 24, 2009.

English Translation of Office Action in Japanese Patent Application No. 2003-56757623, mailed Mar. 10, 2009.

* cited by examiner

METHODS OF MAKING DEVICES BY STACKING SHEETS AND PROCESSES OF CONDUCTING UNIT OPERATIONS USING SUCH DEVICES

FIELD OF THE INVENTION

The present invention relates to methods of making devices by stacking sheets. The invention also relates to methods of conducting unit operations on fluids in such devices.

INTRODUCTION

The following introduction section is intended to provide a clearer understanding of the invention, it includes descriptions of both inventive and prior technology.

Microchannel devices made from shims can be designed and fabricated using multiple shim styles. In a first style, the full flow channel is cut directly out of a thin metal shim. The thickness of the metal serves as the microchannel dimension (typically less than 2 mm). Adjacent to the channel formed via the cut out is a wall shim. The wall shim creates a fin that separates parallel channels of the same fluid. The channels are connected through the use of holes that are aligned in every shim. The connected passageway serves as the header for the group of parallel channels or a footer to collect the fluid after it has passed through the channels. A unit operation such as heat exchange, reaction, or separation, is achieved by creating another set of parallel channels underneath the first set of parallel channels. Channel orientation is denoted as top-bottom.

A device 10 laminated in this manner is illustrated in FIG. 1a. Shims 12, 14, 16, and 18 are stacked together wherein each shim is parallel to shim 12. These shims are repeated as required to create the desired number of channels. The shims can be bonded together by a process such as diffusion bonding, reactive metal bonding, or laser welding. Typically, a shim will contain apertures 20 that open into channels 22, 24. A catalyst could be loaded into reaction chamber 15. During operation of the laminated device, fluid flow (as indicated by arrows 30, 32, 34) is substantially perpendicular to sheet thickness (substantially parallel to sheet width). Although flow through aperture 20 is substantially parallel to sheet thickness, overall flow is perpendicular to sheet thickness. Aperture 20 serves as a header or footer to connect flow channels rather than performing a unit operation within this flow path. Typically, channels 22, 24 provide heat exchange. This design provides good supported areas for bonding and strength. In this design channels may be rectangular, trapezoidal, wavy, but not circular. The smallest dimension of the microfeatures are typically controlled by the thickness of the sheet.

An alternate design orientation is shown in FIG. 1b. Through cuts are made in shims to create flow channels. A shim is placed adjacent to the flow channel to create a wall that separates two distinct flow streams. The second flow path is created by a third shim adjacent to the wall shim. The wall shim between the two fluid streams is the plane through which heat transfers for a unit operation, such as heat exchange or reaction. The third shim also contains a through cut to create a flow path. The headers and footers are made by through holes in each shim that open up to the respective flow paths of the two fluids. In this style, parallelepiped or other flat-walled channels can be economically constructed. Examples of flat-walled channels made with this style are shown in U.S. Pat. Nos. 6,129,973 and 6,192,596. Channel orientation is denoted as interleaved.

Alternatively, a device could be constructed as shown in FIG. 2. In this figure, the slices can be viewed as being stacked from bottom to top in the orientation of slice 51. Advantages of this construction include: that microfeatures can be controlled by shim thickness; thick shim plates 52 can be used to resist pressure; a catalyst chamber 54 can be sized to match the area of heat exchanger channels; and catalyst chamber layers can be interleaved with heat exchange layers. Channels can be economically constructed from shims with rectangular apertures. In addition, wavy or other shaped channels could be formed on slice 51.

Another design, sometimes referred to as a "clam shell" design (not shown), uses sheets having partially etched channels. If the partially etched channels are in the form of semicircles, two corresponding sheets can be bonded to form tubular channels. The compact reactors pictured in WO 01/10773 A1 could be formed from a clam-shell design.

An advantageous alternative design is illustrated in FIG. 3. In this construction, a device 70 is made by stacking shims oriented in the direction of shim 72, and bonding together. This design, in which, in the completed device, flow is substantially parallel to sheet thickness (substantially orthogonal to sheet width) and is referred to as an "ortho" design. Apertures 74 create a reaction chamber, while apertures 76 and 78 create heat exchange channels. A major advantage of the ortho design is that it allows the economical creation of shims with a myriad of aperture designs that could be made, for example, by stamping identical patterns in multiple sheets. Examples of designs made practical by the ortho design are shown in FIGS. 4-5.

Hybrid shim styles can be created by combining these styles. One example is the semi-ortho style; sections of the shim are created with ortho features where the flow is substantially parallel to sheet thickness and sections of the shim are also created with alternate features where the flow travels substantially perpendicular to the sheet thickness. An example of this shim design style is shown in FIG. 4g. The left-most features depict an interleaved heat exchanger, whereby one stream (fluid C) is heated (recuperative heat) with its own exhaust, then flows through a second unit operation such as a reactor. In the reactor section, the flow makes a U-bend to flow back into the recuperative heat exchanger, thus preheating the inlet reactant stream. A second fluid (fluid D) flows through the holes that are continuously aligned through each shim and created in the ortho style. Fluid D may be a heat exchange fluid providing heat to an endothermic reaction or to remove heat from an exothermic reaction.

The four shims shown in FIG. 4g are stacked upon each other in addition to other similar shims as required to create the required number of channels to achieve the desired device capacity. A higher capacity for a unit operation requires numbering-up or adding more channels.

SUMMARY OF THE INVENTION

In a first aspect, the invention provides a process of making a device for conducting unit operations on a fluid comprising: stacking a plurality of shims such that a continuous flow path is formed through the shims; wherein the flow path extends in a direction substantially parallel to shim thickness; wherein the plurality of shims comprises at least three adjacent shims through which a flow path is formed and wherein a straight, unobstructed line is present through the flow path in said at least three shims. The three shims are configured such that a unit operation can be performed on a fluid in the flow path. The shims are bonded to form a device capable of performing a unit operation on a fluid.

In another aspect, the invention provides a process of making a device from a plurality of shims, passing a fluid through said device and conducting a unit operation on the fluid. In this process, a plurality of shims are stacked such that a continuous flow path is formed through the shims. The flow path is substantially parallel to shim thickness. The plurality of shims comprises at least three shims through which a flow path is formed and wherein a straight, unobstructed line is present through the flow path in said at least three shims. The flow path in the at least three shims does not mix with any other flow paths. The shims are bonded to form a device capable of performing a unit operation on a fluid. Then a fluid passes into the device such that a fluid passes through the flow path in said at least three shims; and at least one unit operation is performed on the fluid as it passes through the flow path in said at least three shims.

The invention further provides a process of conducting a unit operation on a fluid, comprising: stacking a plurality of shims such that a continuous flow path is formed through the shims; wherein the flow path is substantially parallel to shim thickness; wherein the plurality of shims comprises at least three shims through which a flow path is formed and straight, unobstructed line is present through the flow path in said at least three shims; bonding the shims to form a device capable of performing a unit operation on a fluid; passing a fluid into the device such that the fluid passes through the flow path in said at least three shims; and performing at least one unit operation on the fluid as it passes through the flow path in the at least three shims.

The invention also provides a process of conducting a unit operation on a fluid, comprising: stacking a plurality of shims such that a continuous flow path is formed through the shims; wherein the flow path is substantially parallel to shim thickness; wherein the plurality of shims comprises at least three shims through which a flow path is formed and wherein the flow path in said at least three shims has a minimum dimension (height or width) of at least 10 μm; bonding the shims to form a device capable of performing a unit operation on a fluid; passing a fluid into the device such that the fluid passes through the flow path in said at least three shims; and performing at least one unit operation on the fluid as it passes through the flow path in the at least three shims.

In another aspect, the invention provides a process of making a device from a plurality of shims, passing a fluid through said device and conducting a unit operation on the fluid. In this process, a plurality of shims are stacked such that a continuous flow path is formed through the shims; wherein the flow path is substantially parallel to shim thickness. The shims are bonded to form a device capable of performing a unit operation on a fluid; wherein the unit operation is selected from the group consisting of distilling, reacting, adsorbing, heating, cooling, compressing, expanding, separating, absorbing, vaporizing, condensing, and combinations of these. A fluid passes into the device such that the fluid passes through the flow path in said at least three shims; and at least one unit operation is performed on the fluid as it passes through the flow path in the at least three shims.

The invention further provides, a method of making a laminated device containing a component, comprising: stacking at least four adjacent shims; wherein each of the at least four shims comprises an aperture; wherein the apertures in each of the at least four shims form a continuous flow path through each of said at least four shims; wherein the aperture in each of said at least four shims is empty or is partially blocked by a mixing projection; and wherein a straight, unobstructed line is present through the continuous flow path or through the continuous flow path and mixing projections. The at least four shims are bonded together. In related aspects, the invention also includes an apparatus made by this method. The invention further includes processes, such as mixing, that use the apparatus made by this method.

Note that an aperture could alternatively be recited as internal edges of a shim defining an aperture or as a shim that has internal borders that define an aperture.

In a further aspect, the invention provides a laminated device that includes: a first set of microchannels wherein each microchannel has an inlet and an outlet, a header connected to the inlets of the first set of microchannels; a footer connected to the outlets of the first set of microchannels. The device includes a header or footer structure, in which the header has a surface that curves toward at least a portion of the inlets of the first set of microchannels, and/or the footer has a surface that curves toward at least a portion of the outlets of the first set of microchannels, and/or the footer comprises a roof, located on a side of the footer opposite the side that is connected to the outlets of the first set of microchannels, and the roof is sloped relative to the outlets of the first set of microchannels.

The invention also provides apparatus for vaporizing water that includes: an inlet leading to a first set of microchannels for a liquid to flow into; a second set of microchannels for a fluid to flow through; wherein the first set of microchannels is adjacent to the second set of microchannels; and wherein the vaporizer possesses a performance characteristic. For example, the vaporizer can have a characteristic such that, when tested with 1.5 ppm total dissolved solids (TDS) water of which the total solids comprises at least 7% Ca, 15% Mg and 2% Si is passed through the first set of microchannels at 280 psig, a 210° C. inlet temperature, and a flowrate of 20 mL/min and a flow air of air at 8 psig, 279 C and a flowrate of 247 SLPM, over 40% of the water boils with a pressure drop rise of less than 5 psig through the first set of microchannels after 1000 hours of operation. Alternatively, or additionally, the apparatus could be characterized by low pressure drop such that, when tested by flowing air at 247 SLPM and 279° C. through the second set of microchannels and water at 20 mL/min and 280 psig through the first set of microchannels, pressure drop through the first set of microchannels is 5 psig or less. Preferably, the microchannels are at least 1 cm (in some embodiments at least 5 cm) long. In apparatus and methods of vaporizing water with 1.5 ppm or greater of dissolved solids, it is preferred that pressure drop through the water channels increases by less than 5 psig after 1000 hours of operation. Alternatively, or additionally, the apparatus or methods could be characterized by a volumetric heat flux of 1 W/cm$^3$ or greater, optionally combined with other characteristics such as low pressure drop.

In yet another aspect, the invention provides a laminated device capable of transferring heat to or from a fluid passage within the device, that includes: a stack of shims that have been bonded together; wherein the stack of shims comprises a first component having dimensions of height, width and thickness; wherein at least a portion of the height of the first component is greater than 1 μm, at least a portion of the width of the first component is greater than 1 μm, and at least a portion of the thickness of the first component is greater than 1 μm; wherein height, width and thickness are mutually perpendicular; wherein the stack of shims comprises a second component having dimensions of height, width and thickness; wherein at least a portion of the height of the second component is greater than 1 μm, at least a portion of the width of the second component is greater than 1 μm, and at least a portion of the thickness of the second component is greater than 1 μm and wherein at least a portion of at least one of the height, width or thickness of the second component is less than 2 mm; wherein the directions of height, width and thickness are the same directions as the first component; wherein the stack comprises shims, wherein at least 3 adjacent shims contain at least one aperture within each shim, the apertures being defined by borders within each shim, and the second component is within or is formed by the at least one aperture in each of said at least 3 adjacent shims; and wherein the second component conforms to the first component in the directions of height, width and thickness. Shims that could be used to make such a device are illustrated, for example, in FIGS. 5(c) and 6(c). Components could be, for example, heat exchangers, reaction chambers, or any small device in need of heat exchange. The term "conforms" means more than merely two planar components, the second component conforms in three dimensions not just two dimensions. The invention also includes methods of making such devices and processes of using such devices to perform a unit operation such as a process of transferring heat.

The invention also includes methods of fluid processing in place of, or in addition to, any of the methods involving unit operations, where "fluid processing" includes mixing or any unit operation.

Of course, any of the aspects can be combined with additional features (such as in semi-ortho designs), and these are included in the above-described aspects. The invention also includes devices having any of the unique structural features or designs described herein. The invention also includes processes using any of the structural features or designs described herein.

Various embodiments of the present invention may possess some or all of the following advantages: low cost, rapid construction, and ease of design and manufacture. The ability to create circular or rounded microchannels through the use of shims in the ortho design allows for microdevices to be operated with large interstream pressure differentials. The pressure differential may range from 0 to hundreds of atm. A similar design with rectangular microchannels would have square corners and a higher stress concentration factor. To overcome this stress concentration factor for square-cornered microchannels, more metal would be required between the fluid streams or more structural support ribs would be required within the microchannel to support the pressure differential.

An additional advantage of some inventive embodiments is the ease of creating nonrectangular microchannels in the interleaved fluid orientation. Non-rectangular microchannels, such as the wavy channels shown in FIG. 4c may be advantageous for improving heat transfer. In these channels, heat transfer may be enhanced by creating a boundary layer separation that increases convective heat transfer coefficients. Higher heat fluxes may be achieved when boundary layer separation occurs. Thus, the ortho style shims that create wavy or other irregular features are advantageous.

Other advantages of the ortho style shims and specifically the non-rectangular microchannels, is the ability to create a conformal microchannel around a device that needs to be cooled or heated. One example is for cooling electronics. Another example might be to heat or cool a cylindrical device with an ortho style exchanger. In these cases, the conformal microchannel created from the ortho design may be placed immediately adjacent to the object that requires heat transfer. The interleaved style described in FIG. 1b could be used to create a conformal array of microchannels in alternating shims in a semicircular manner (see U.S. Pat. No. 6,129,973 there is a drawing to this effect), but these semi-circular flat-walled microchannels orient the flow paths in fins above the desired conformal object. Heat transfer through fins is always or nearly always less efficient than heat transfer through a wall as denoted by the use of a fin-efficiency whereby the total available surface area of the fins is discounted as it is less effective than the wall separating two fluid streams.

Another advantage of the ortho shim style is the option to create a structured or roughened surface for heat transfer. Such features act to separate or trip the boundary layer such that enhanced heat transfer may be achieved.

Examples of applications of various embodiments include, but are not limited to: the cooling of the electronic components with high heat generation rates, high power solid-state laser systems, heat exchange in micro propulsion systems and micro combustors, compact chemical reactors or processing systems, fuel cells, and air conditioning systems where the coolant channels should be located close to the heat source to remove generated heat of high density or to maintain a uniform solid wall temperature.

GLOSSARY

The term "bonding" is not limited to diffusion bonding but includes any suitable method for sealing shims together.

By "devices" is meant entire laminated devices or laminated components that may be within a larger system.

A flow path "dimension (height or width)" refers to a dimension of a flow path (a flow path may also be called a fluid passage) measured in any cross section that is perpendicular to thickness. A minimum dimension means that the flow path cannot be smaller than the recited dimension at any point along the path through the specified number of sheets.

A "microchannel" has at least one dimension of 2 mm or less.

"Shims" refer to substantially planar plates or sheets that can have any width and height and preferably have a thickness (the smallest dimension) of 5 millimeter (mm) or less, and in some preferred embodiments between 50 and 1000 µm. In this disclosure, a set of identical shims (or sheets) that are bonded together may also be called a shim.

That a "straight, unobstructed line is present through the flow path (or, equivalently, fluid passage)" does not mean that the entire flow path must be straight and unobstructed, nor that a portion of the flow path is completely free from any projections, but rather that at least a portion of the flow path is straight and unobstructed such that a straight rod (having a finite thickness, i.e. a rod that is not infinitely thin) could be placed in the flow path through the entire thickness of the recited number of shims; the flow path includes but is not limited to a straight and unobstructed flow path. A flow path that contains a membrane, porous film or perforated sheet is not considered "unobstructed."

By "substantially parallel to sheet (or shim) thickness" it is meant substantially perpendicular to sheet (or shim) width, and permitting of some curvature or minor, or partial deviation from 90° with respect to shim width. A flow path that travels parallel to shim thickness over the surface of a shim, through an opening in an adjacent shim, and down to the surface of another shim and again runs parallel to shim thickness, is not "substantially parallel to sheet (or shim) thickness;" alternatively stated, "substantially parallel to sheet (or shim) thickness" does not include flow through headers/footers in the first shim style.

"Unit operation" means chemical reaction, vaporization, compression, chemical separation, distillation, condensation, heating, and cooling. "Unit operation" does not mean merely mixing or fluid transport, although mixing and transport frequently occur along with unit operations.

BRIEF DESCRIPTION OF THE FIGURES

FIGS. 7b-7d are overhead views of shims within the reactor illustrated in FIG. 7a.

DESCRIPTION OF PREFERRED EMBODIMENTS

FIGS. 4-5 illustrate a few shims that can be laminated to form devices (including components in devices); it should be understood that the examples are merely illustrative, the invention should not be understood to be limited to the illustrated embodiments. The devices (including components) would be difficult or impossible to construct using traditional shim designs for lamination procedures.

Figure 1A:
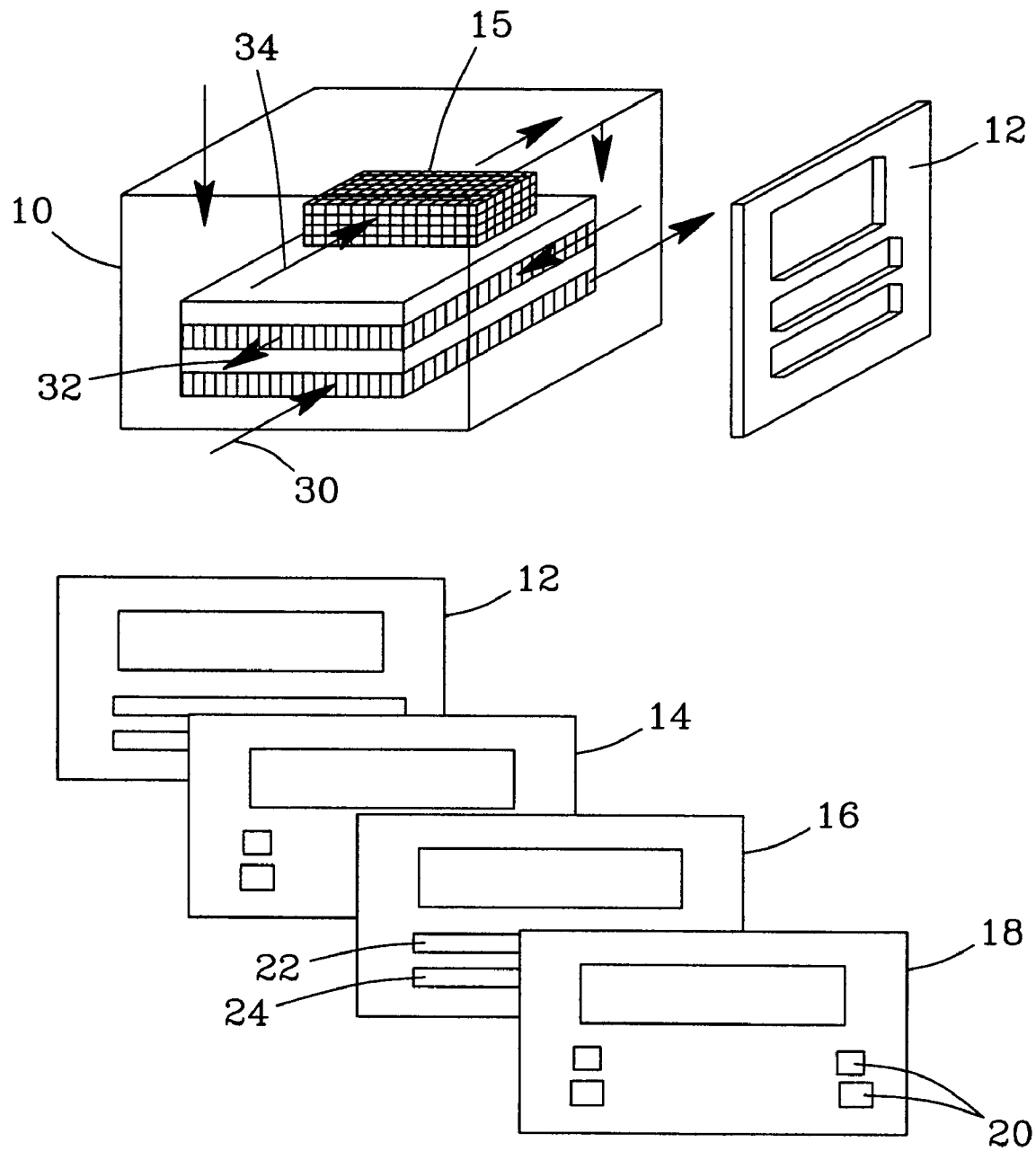
FIG. 1a illustrates a laminated device in which flow is substantially perpendicular to sheet thickness.
Figure 1B:
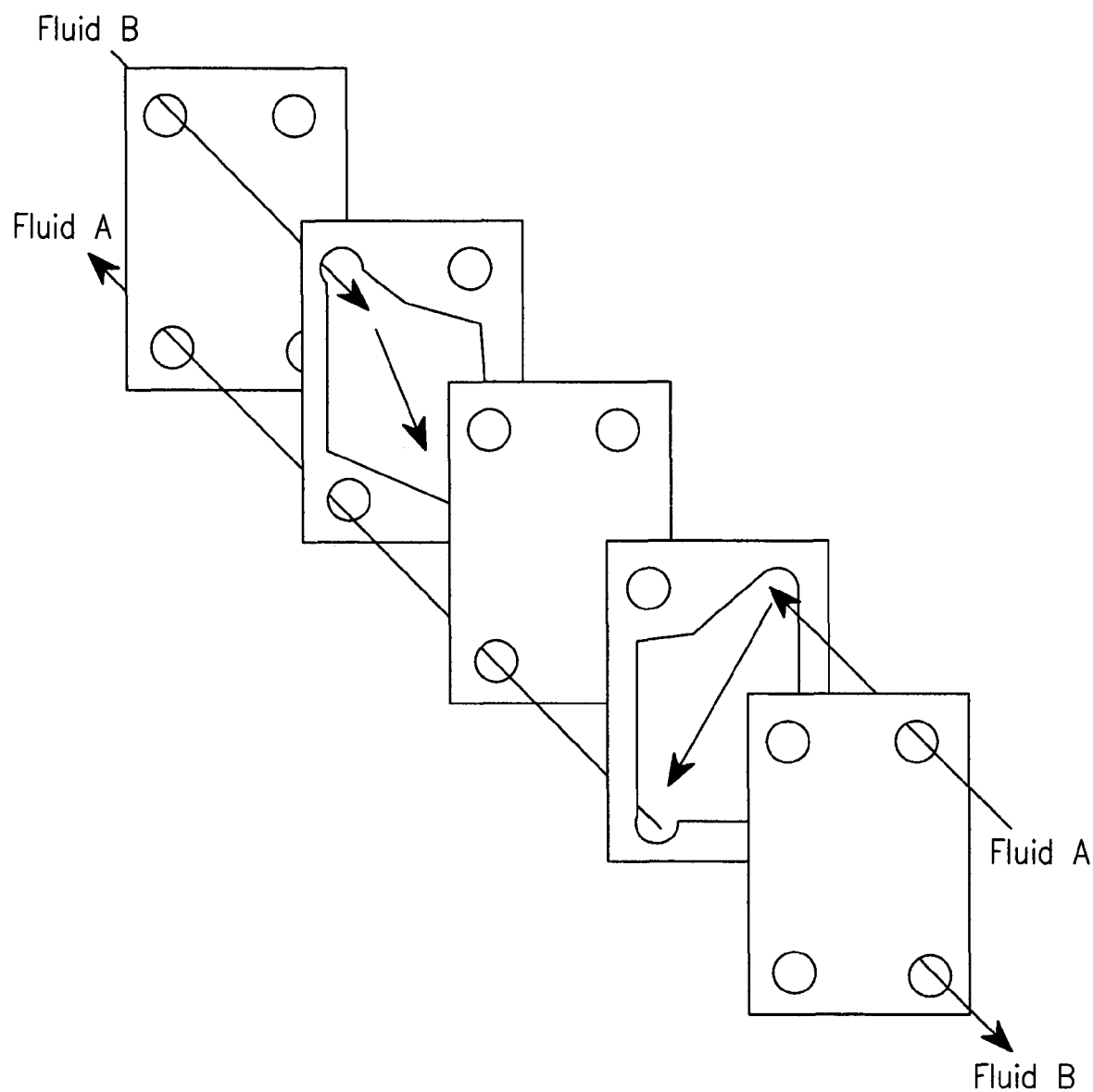
FIG. 1b illustrates another laminated device in which flow is substantially perpendicular to sheet thickness.
Figure 2:
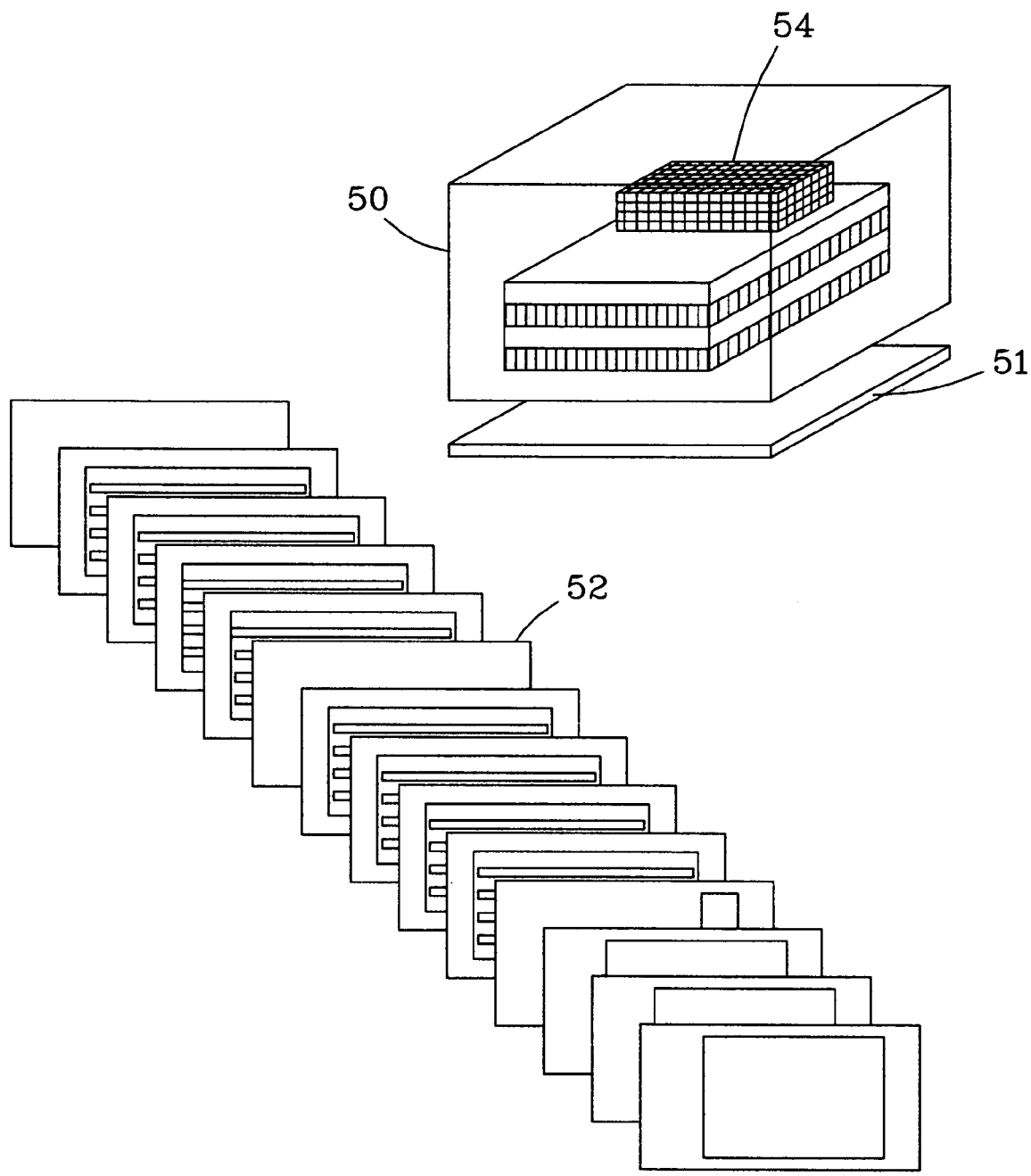
FIG. 2 illustrates another style of a laminated device in which flow is substantially perpendicular to sheet thickness.
Figure 3:
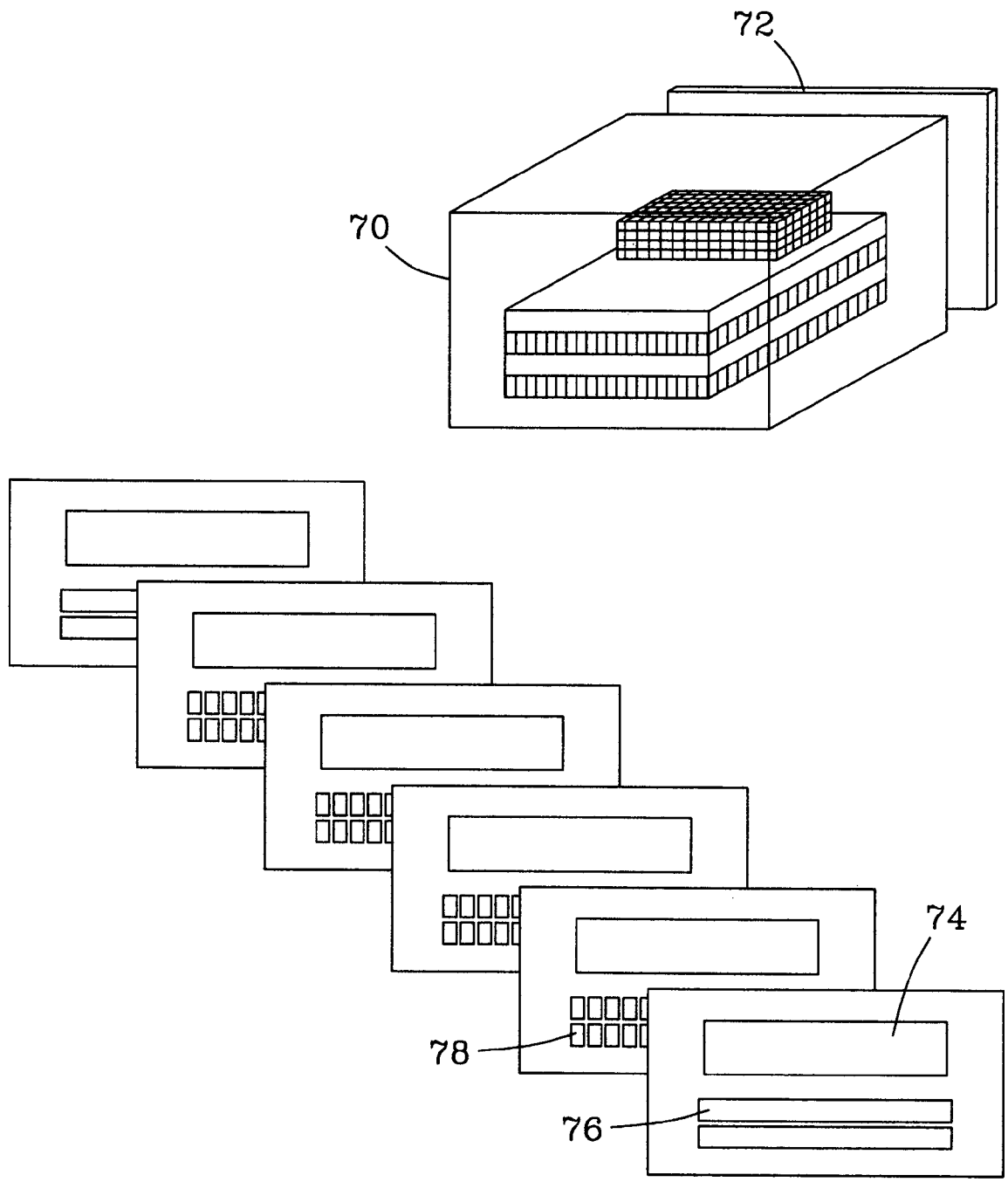
FIG. 3 illustrates one type of laminated device made in the ortho style.
Figure 4A:
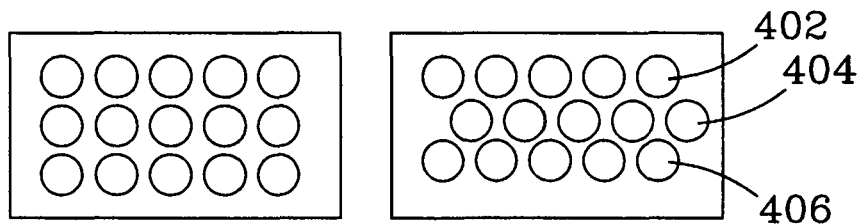
FIG. 4a illustrates overhead views of shims, in which the dark area is shim material and the light areas are apertures that can stack with identical shims to form tubular channels.

The shims in FIG. 4(a) have rows of circular apertures 402, 404, and 406. In a typical operation, at least two of the rows are at a different temperature. The resulting tubular channels provide superior pressure resistance, strength and crack resistance. As with all the designs described herein, they are especially well-suited for use in microdevices. For example, each tubular channel can have a cross-sectional diameter of preferably less than 5 mm and more preferably less than 2 mm.

Figure 4B:
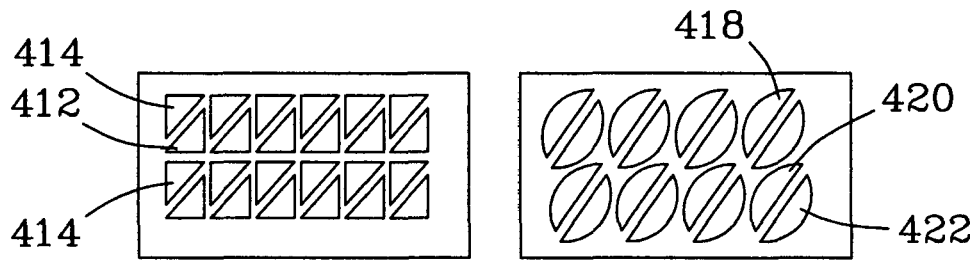
FIG. 4b illustrates shims with triangular or clam-shell-shaped apertures that can be stacked to form prismatic or hemispheric channels.

FIG. 4b illustrates a configuration particularly useful for heat exchange. Triangular channels 412 have adjacent channels 414 on all three sides. Thus, where 412 is at a different temperature than channels 414—a highly effective heat transfer can be obtained. Also, diagonal walls can easily be constructed for heat transfer enhanced by high surface area between hot 420 and cold 422 channels.

Figure 4C:
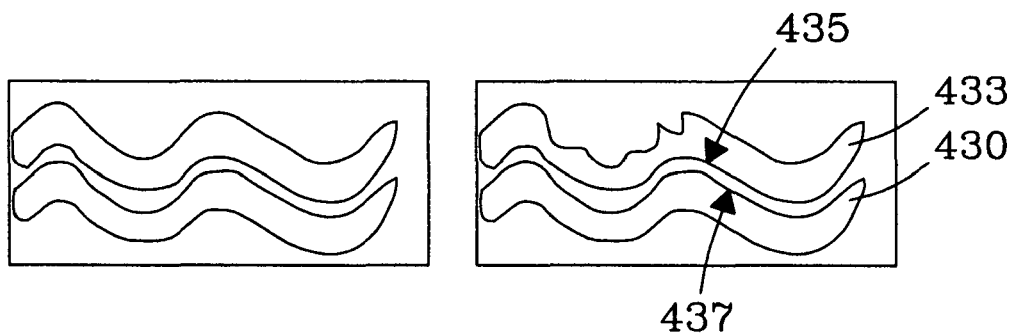
FIG. 4c illustrates shims with irregularly shaped apertures that can be stacked to form irregularly-shaped channels.

FIG. 4c illustrates irregularly shaped apertures 430 and 433. Aperture 433 is scalloped. The resulting channels can provide enhanced surface area for heat transfer, separation such as sorption, and/or catalysis (and, in some embodiments, turbulent flow). For example, channel 433 (formed by stacking multiple shims) could be coated with a catalyst composition (for example, an alumina wash coat followed by a metal impregnation or surface coating, not shown), while channel 430 is a heat exchange channel. In some preferred embodiments, shims have at least 2 irregularly shaped (i.e., not rectangular, not regular wave, etc.) apertures with conforming adjacent surfaces such as 435, 437—and laminated devices having channels with corresponding characteristics.

Figure 4D:
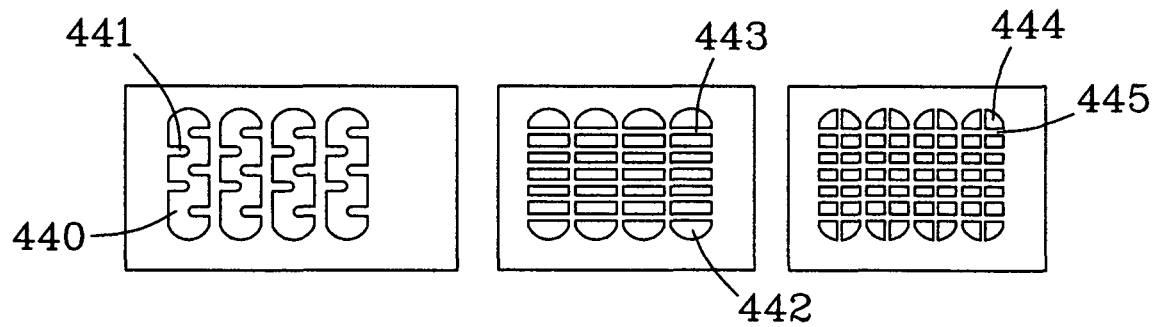
FIG. 4d illustrates shims with shims with oblong apertures containing fins that can be stacked to form elongated, fin-containing tubes.

FIG. 4d shows apertures 440, 442, 444 and fins 441, 443, 445. In this figure, the generally oblong apertures may be configured to alternate, from left-to-right, hot-cold-hot, etc.

Figure 4E:
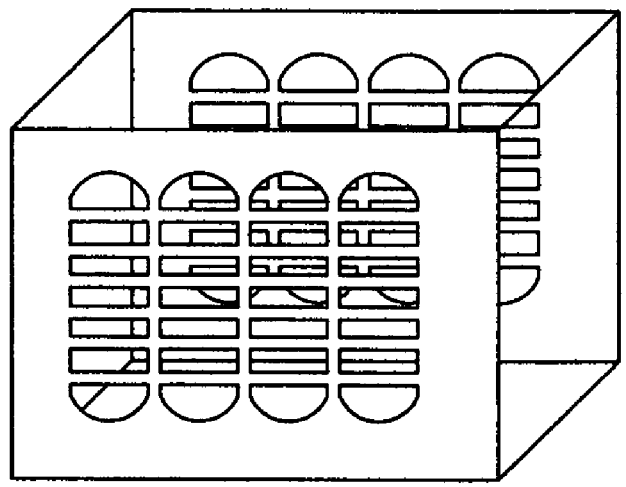
FIG. 4e is a representation of a 3-dimensional device formed by laminating shims of the type shown in the center of FIG. 4d.

FIG. 4e is a three dimensional representation of a device resulting from stacking shims shown in the center view of FIG. 4(d). The shims can be stacked with identical shims, alternating designs, or mixed in other selected or random patterns. In general, depending on the desired device characteristics, the ortho design principle allows easy stacking of identical or different shims (any type of aperture-containing shims), provided the shims are designed with some aligned apertures for fluid flow.

Figure 4F:
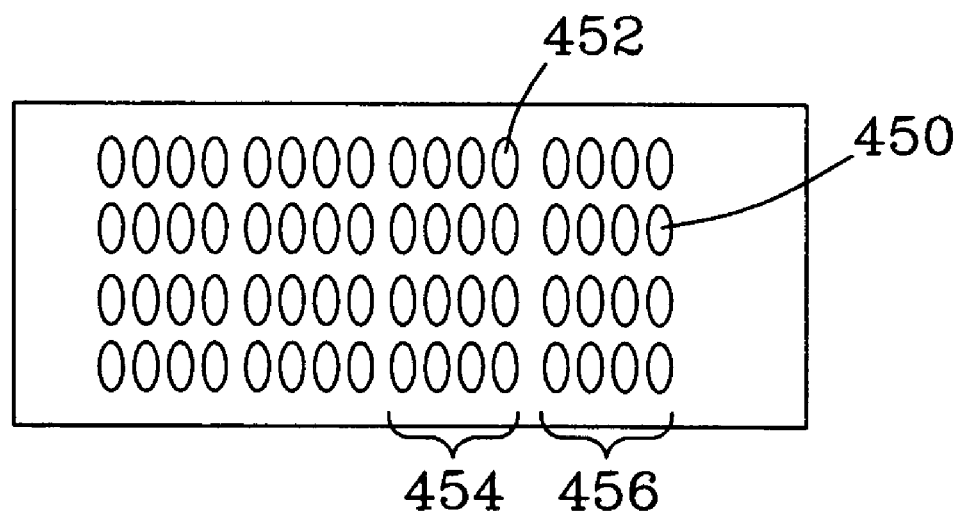
FIG. 4f illustrates shims with groups of oval-shaped apertures that could be stacked to form groups of oval-shaped tubes.

FIG. 4f illustrates a shim with multiple apertures 450, 452 for higher surface area. Groups of apertures 454, 456 can operate at different intergroup temperatures.

Figure 4G:
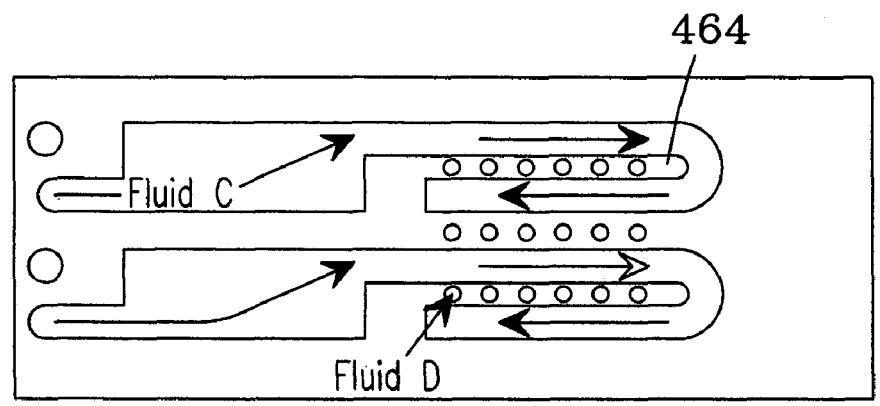
FIG. 4g illustrates a semi-ortho concept. In the specific design illustrated, a reactor includes integral heat recuperation of the reactant and product stream.
Figure 4G:
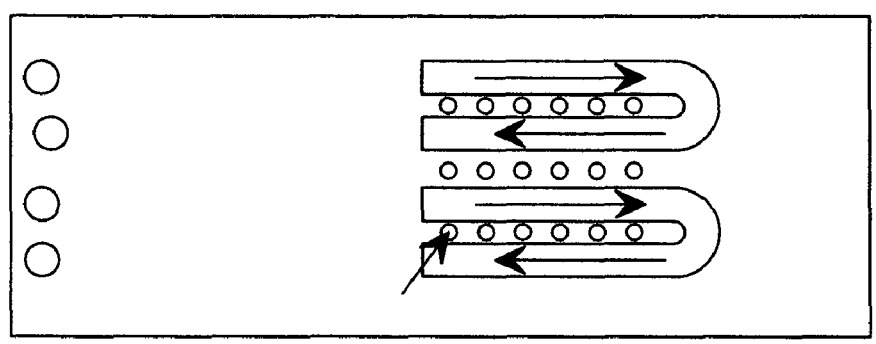
Figure 4G:
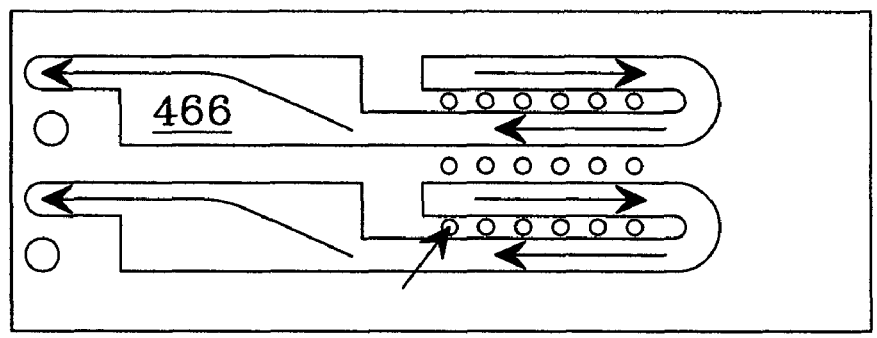
Figure 4G:
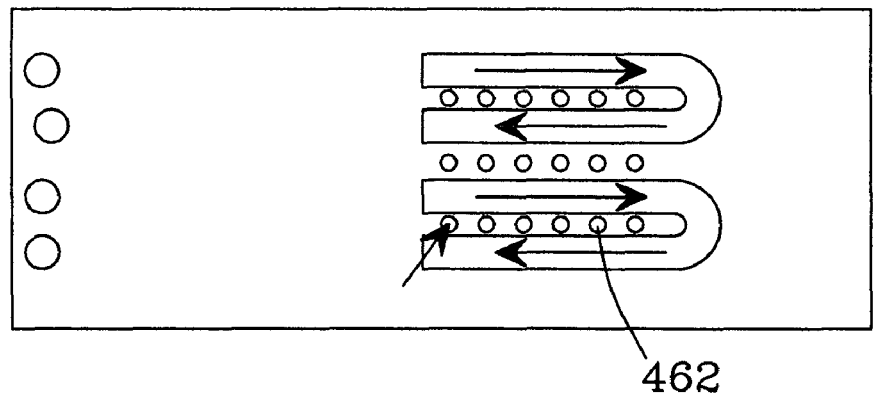

FIG. 4g illustrates a semi-ortho design for a reactor that includes integral heat recuperation of the reactant and product stream. The apertures 462 in the reactor section are created in the ortho style, where flow is substantially parallel to sheet thickness. The slots 464 in the reactor section are aligned to create an open flow channel and flow is substantially parallel to sheet width. The apertures 466 in the heat exchange section (e.g., a preheat section) are interleaved with walls to create a recuperative exchanger where flow is substantially parallel to sheet width. The reaction channels 464 are an example of quasi-ortho design illustrating another aspect of the present invention. In this embodiment, there are multiple (at least three) channels through which a straight, unobstructed line is present (the illustrated embodiment has a straight-through open channel). The reactor channel design (by itself) is not an ortho design because flow through the channel is substantially parallel to sheet width. This design allows communication with some mixing between multiple shims but has flow substantially parallel to sheet width. This design also demonstrates one general approach to integrating multiple unit operations within a device.

Figure 5A:
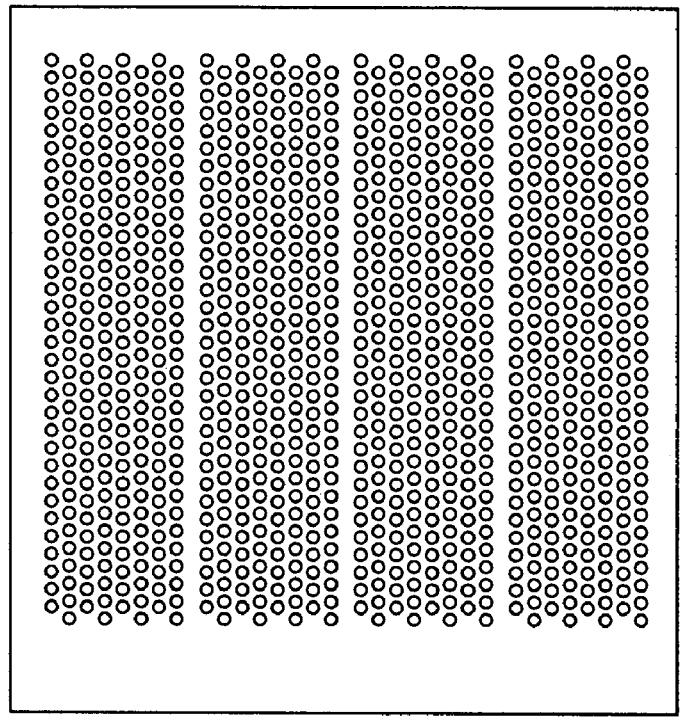
FIG. 5a illustrates shims with groups of circular apertures that could be stacked to form groups of cylindrical tubes.
Figure 5B:
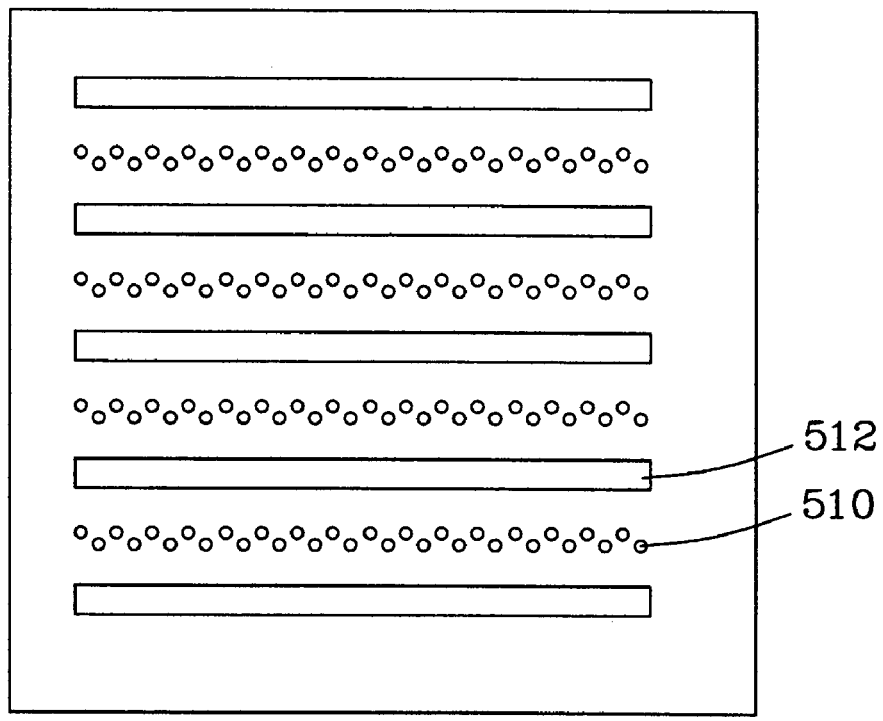
FIG. 5b illustrates shims with alternating rows of slots and circular apertures that could be stacked to form alternating rows of cylindrical tubes and rectangular slots.

FIG. 5a is a similar arrangement as FIG. 4f, except with circular apertures. FIG. 5b shows a shim with alternating rows of holes 510 and slits 512. An advantage of mixing geometric shapes, such as holes and slots, may be realized for embodiments where a larger open area is desired for one flow path, and yet there is also a high interstream pressure differential. A larger open area may be advantageous for inserting a catalyst or for increasing the open area for flow and thus by reducing pressure drop.

Figure 5C:
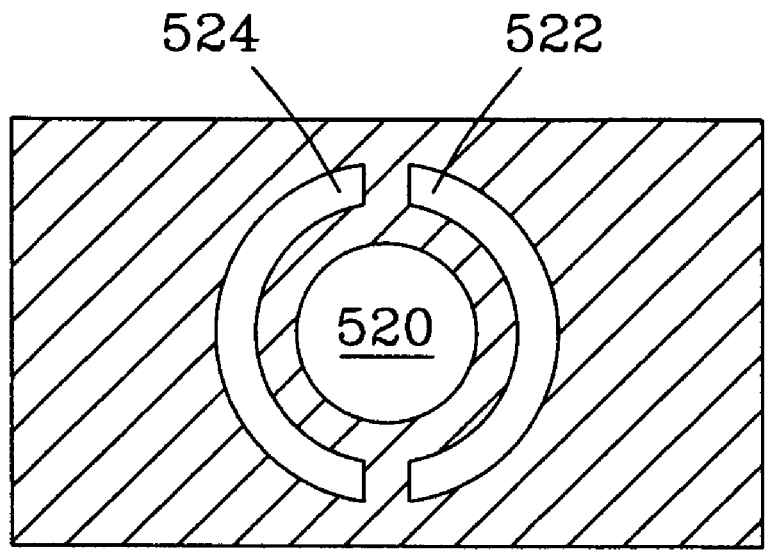
FIG. 5c illustrates a shim having a circular aperture surrounded by conformal semi-circles that could be stacked to form a cylindrical tube adjacent to conformal hemispherical passages.

FIG. 5c illustrates a shim that can be used to form a first component (in this case a circular aperture 520) with a conformal second component (in this case a hemispherical aperture 522). In a preferred embodiment, the shims are stacked to form a cylindrical tube into which a catalyst is added to form a reaction chamber, the conformal second component can be a heat exchange channel or a second reaction chamber designed to conduct a reaction having the opposite thermicity (for example, an endothermic reaction when the reaction in the cylindrical tube is exothermic).

In various embodiments, desired shims include one or more of the following shapes are formed in a shim: square, rectangle, parallelogram, circle, triangle, irregular shapes (i.e., shapes without symmetry or repeating units), waves, rectangles or squares or triangles with rounded corners, and ovals. These shims can be stacked and bonded to form 3 dimensional apertures (tubes) in shapes such as cylinders, prisms and waves. In some preferred embodiments 3 or more identical shims are stacked adjacent each other. In high pressure applications, cylindrical tubes are especially preferred. For good heat transfer, it is desirable to construct heat exchange channels in conformations that maximize surface contact to the areas of a device in need of heat transfer— examples could be an integrated endothermic/exothermic reactor, vaporizer, recuperator, etc. Desirably, for heat transfer, a shim includes a first aperture and a second aperture whose shape conforms to that of the first aperture; examples include 2 wave-shaped apertures separated by a constant distance, a circle and an arc that surrounds a portion of the circle, and two triangular apertures arranged base-to-base.

Curved channels can have desirable characteristics in various laminated devices. The flow in a curved channel has a large velocity component near the wall towards the concave side. In the application of a fluid mixer, such as for a chemical reactor, a fluid phase separator, or drug distributor, this flow pattern also enhances the mixing process through higher mass transfer rate.

Figure 6A:
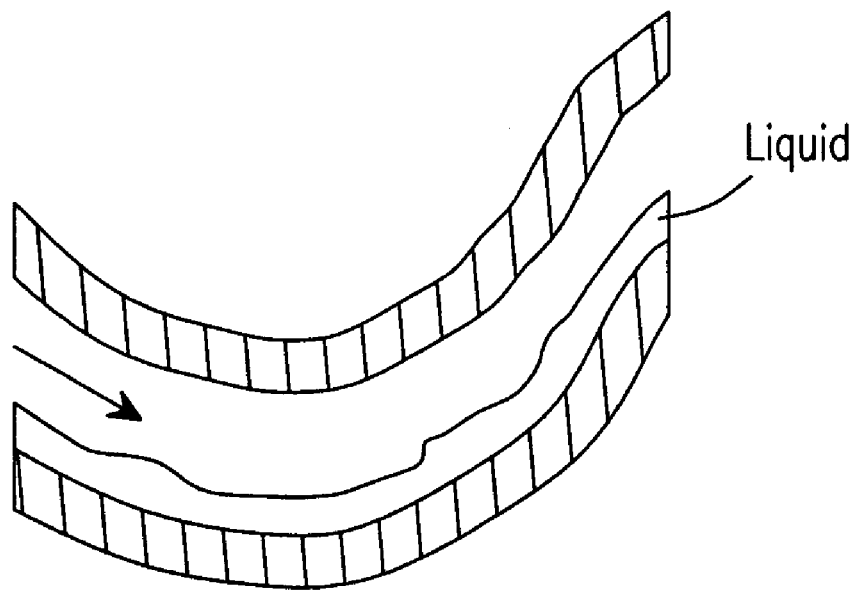
FIGS. 6a-b illustrates condensation in a curved and straight channel of equal diameter.
Figure 6B:
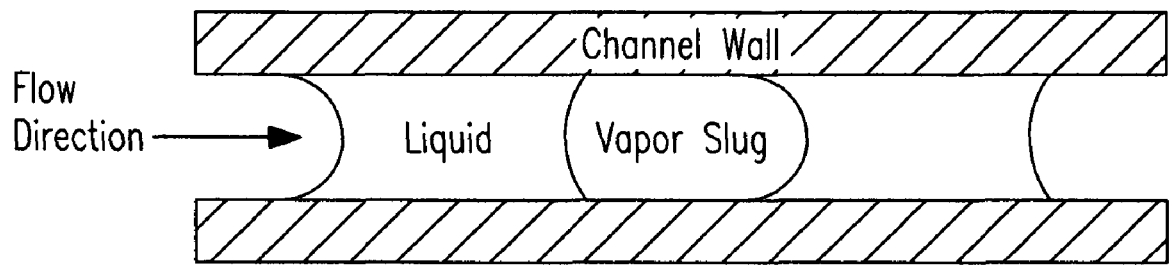

In a two-phase forced convection as in the microchannel condenser, the curved flow passage helps the transition from slug flow to a stratified or annular flow regime so as to form a separate vapor passage, as is shown in FIG. 6a. However, in a straight flow channel, when channel gap size is decreased to a sufficiently small value, the capillary force will raise the liquid level to form a liquid bridge and block the whole channel so that the flow acquires a slug flow regime shown in FIG. 6b. In slug flow, the capillary effect induces extra pressure drop and increases the thermal resistance of condensation by maintaining a relatively large and thick liquid film and lower vapor velocity. A main goal in condenser design is to rapidly remove the condensate from the surface and maintain the vapor-wall contact, a curved micro channel provides a better way to drive the liquid to one side and free the way for vapor in certain flow conditions and geometry.

Figure 6C:
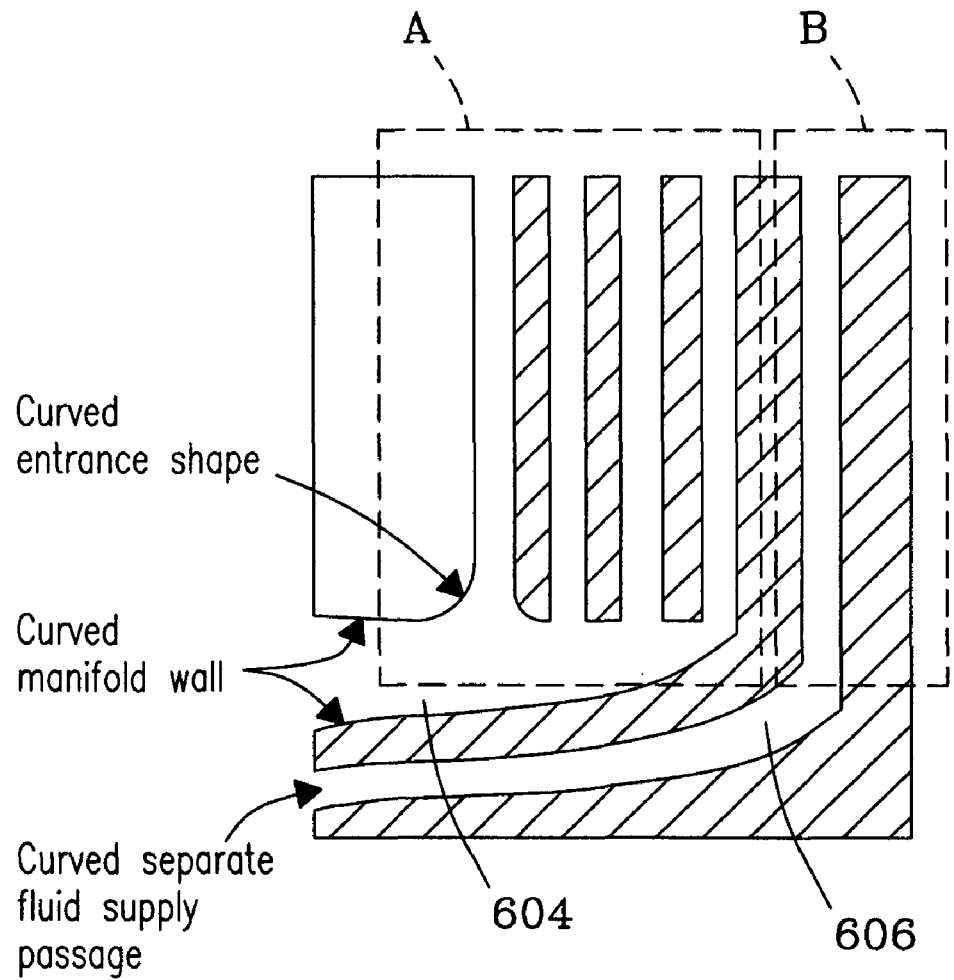
FIG. 6c illustrates a curved microchannel header or footer.

Because a straight header or footer delivers non-uniform flow distributions or serious flow mal-distribution as well as undesired pressure drop profiles, performance can be improved by making the header and footer with varying cross section area. FIG. 6c illustrates the cross-section of a laminated device that could be made by first forming shims comprising both zones A and B, such as by an ortho design with shims designed in the direction of flow and orthogonal to the page, and joined (such as by diffusion bonding) to curved headers (or footers) 604, 606 which could be made by laminating identical shims, having curved apertures, in a non-ortho direction. The entrance head loss due to contraction and sharp turning from the header into the branch channels is reduced by the smooth channel entrance formed by curved shims. The curved header (or footer) 606 also provides flexibility to separately supply fluid to the channels of the heat exchanger where the heat load is significantly different from the other channels and different flow rate is required, especially when the space is constrained by other components. The curved channels can form a transition zone between a chemical reactor (in zone A for example) and a recuperator (zone B) that heats or cools the streams taking part in a reaction or recovers the heat in the product.

Figure 9A:
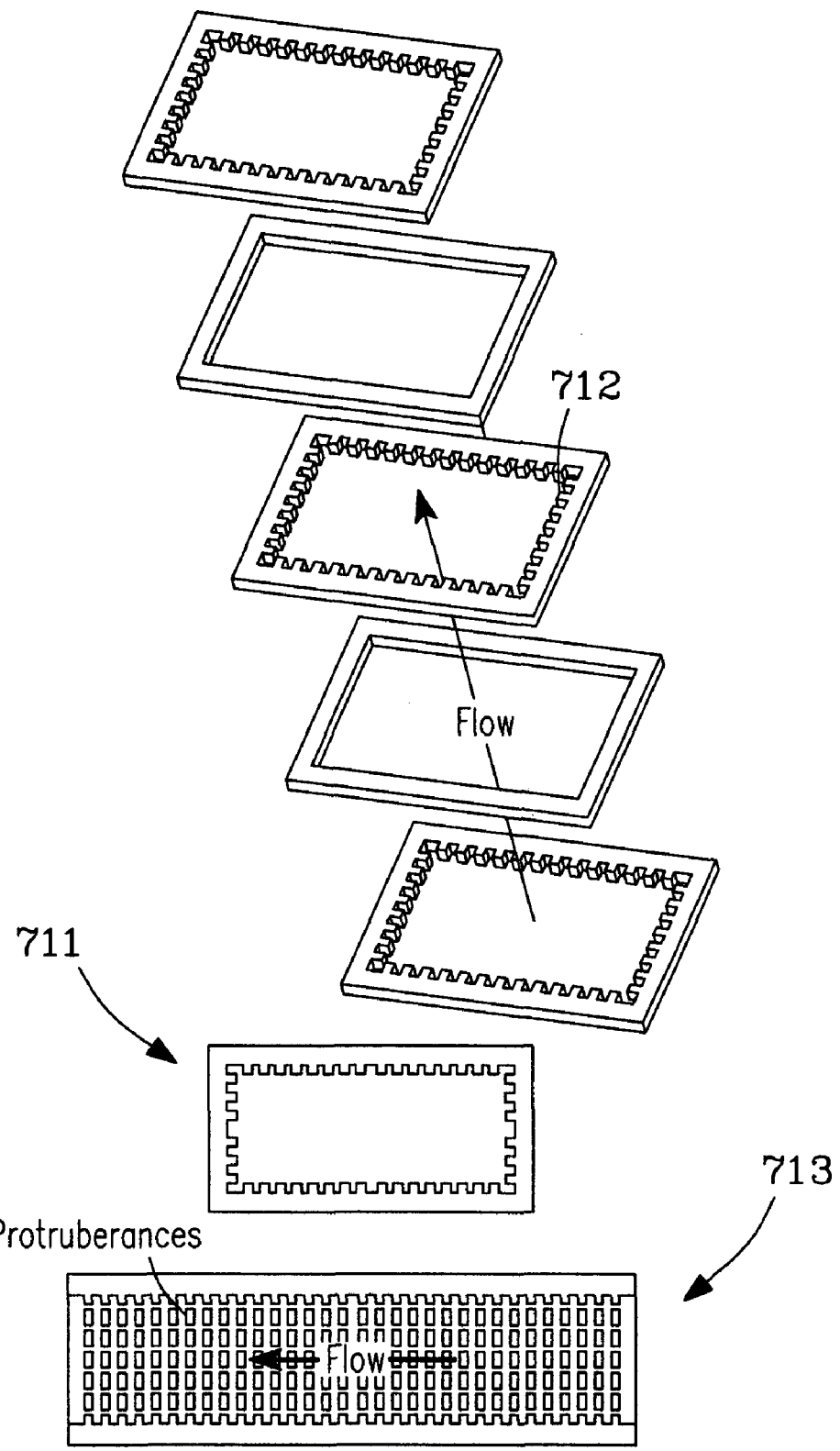
FIG. 9a illustrates an exploded view of a laminated device made of shims having apertures with edge features alternating with shims having smooth edges. Unexploded, overhead views (down a channel) 711 and in cross-section 713, are also shown.
Figure 9B:
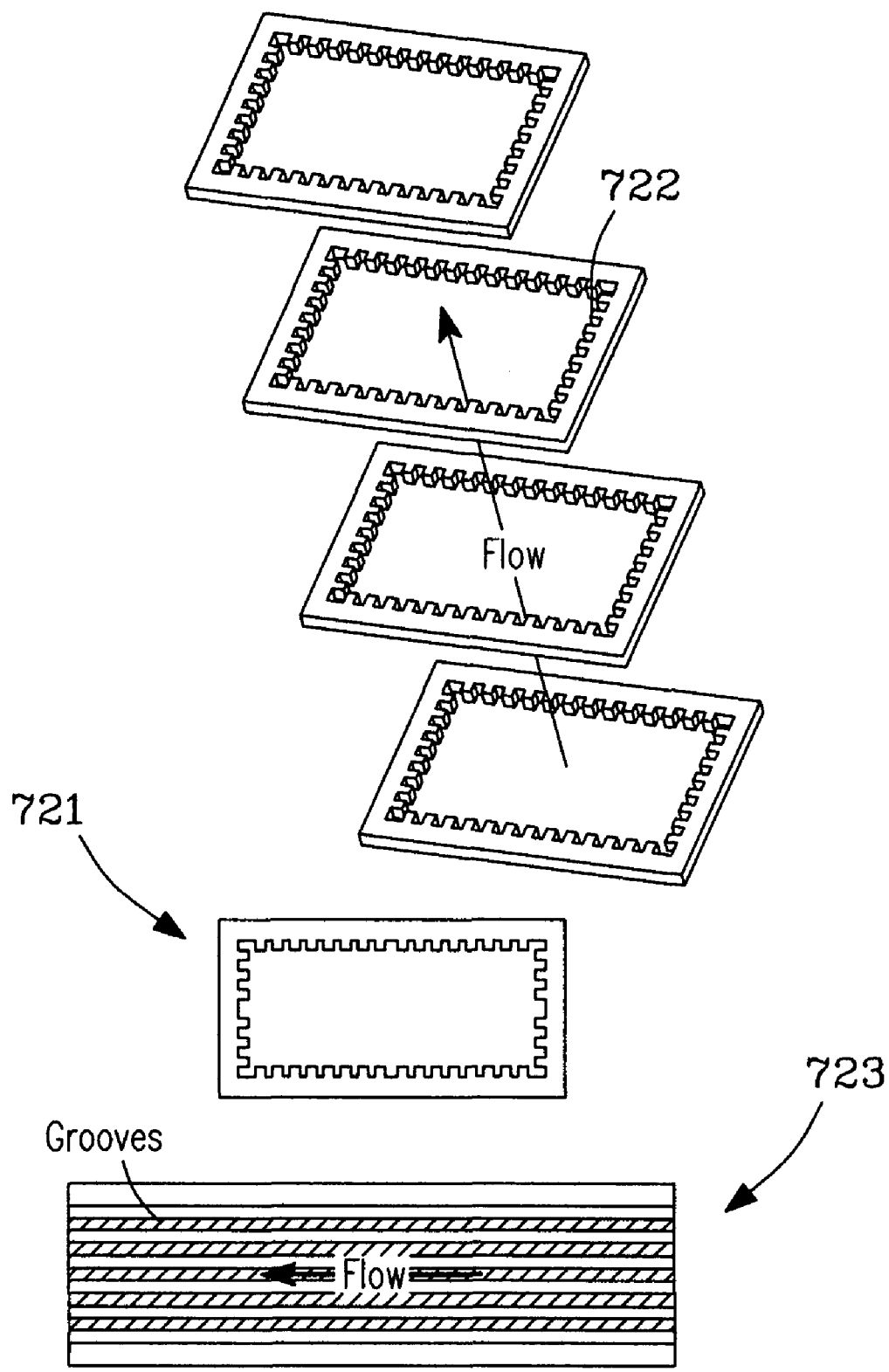
FIG. 9b illustrates an exploded view of a laminated device made of adjacent shims having apertures with edge features. Unexploded, overhead views (down a channel) 721 and in cross-section 723, are also shown.
Figure 9C:
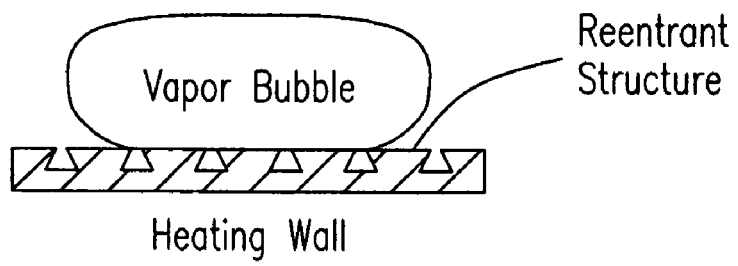
FIG. 9c illustrates a vapor bubble formed on top of a surface with edge features.

Laminated devices having ortho designs formed by apertures through shims with edge features on the aperture edge, that is, on the internal border formed by the edges of the aperture, can provide significant advantages over apertures without edge features. Apertures with edge features are shown in FIGS. 9a-9c. An edge feature is a structure on the border of an aperture that causes at least a 0.1% variation, more preferably at least a 1% variation in the diameter of an aperture. For example, if the border of an aperture has a diameter of 1 cm and smooth edges except for a bump that sticks out 0.05 mm from the border, that bump is not an edge feature, but a 0.1 mm bump would be a feature. In some preferred embodiments, at least 20%, more preferably at least 50%, and in some embodiments at least 90%, or 100%, of the circumference of a border around an aperture is populated by edge features. Borders having 100% of their circumference populated by edge features 712, 722 are shown in FIGS. 9a and 9b. The edge features can have any shape, and could be, for example, squares (shown in FIGS. 9a and 9b), triangles, circles, rectangles, etc. A particularly preferred shape is illustrated in FIG. 9c which shows protuberances in which the cross-sectional diameter of the base (attached to the border) is narrower than the cross-sectional diameter of a part of the protuberance that protrudes from the edge of the (average diameter of the) aperture. The shims with apertures having edge features can be stacked together with each feature adjacent a corresponding feature to form a channel or groove (see FIG. 9b for example) or stacked adjacent shims without corresponding features to form protuberances on a channel (or chamber) wall (see FIG. 9a for example).

In single phase mass and heat exchangers, the corrugated surface formed from the shims shown in FIG. 9a breaks down the thermal boundary layer development in laminar flow, forms the zone of large temperature gradient (thinned boundary layer) and in turn enhances the mass and heat transfer process. In the turbulent flow regime, this structure increases the turbulent mixing. An increased heat transfer area is characterized by the structured micro channel surface.

In flow boiling heat exchangers, the formation of vapor bubbles on a smooth surface of a microchannel causes a high potential of developing hot spots at high quality due to dryout of the thin liquid film underneath the vapor bubble. A structured channel surface made from shims shown in FIG. 9a reduces the chance of this problem through the enhanced liquid supply to the bubble bottom, as is depicted in FIG. 9c. The microstructure of the grooves and the corrugations increases the liquid flow towards the bubble bottom driven by capillary force. A protrusive structure, such as in FIG. 9c, increases the solid wall area underneath the bubble and in the contact area with the liquid, as such the evaporation process is more efficient than a smooth surface. Thus, overall heat transfer is significantly enhanced with lower wall temperature and higher heat flux than that obtained with a smooth surface.

Figure 8A:
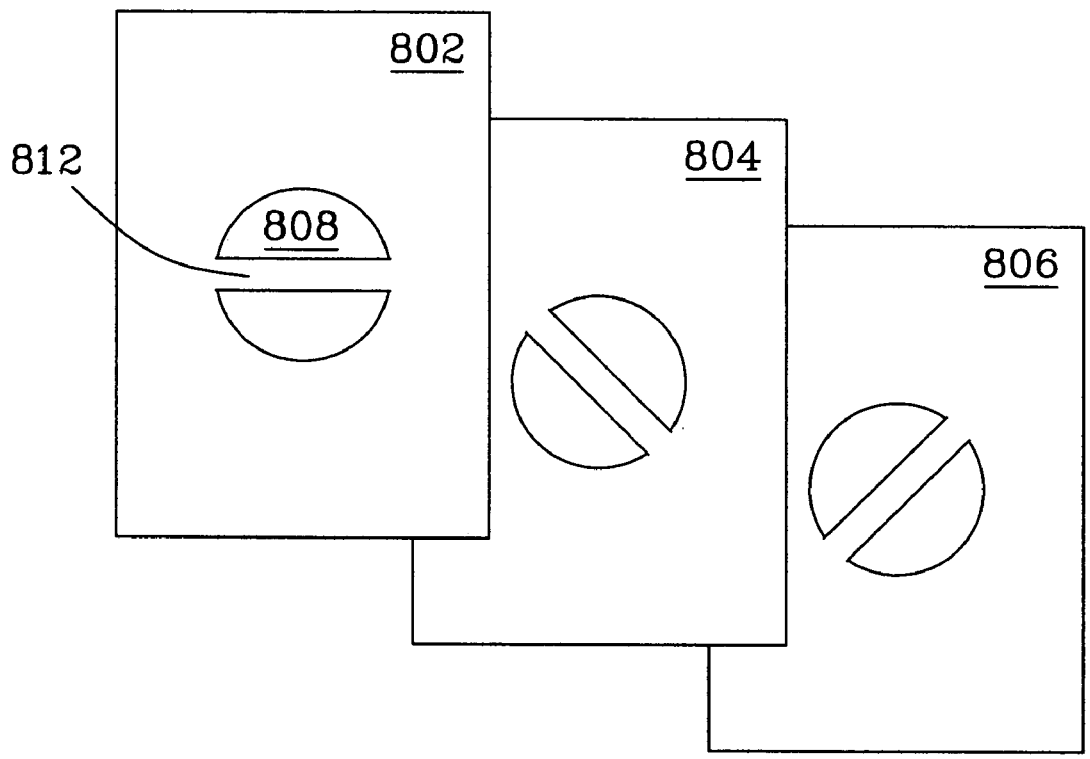
FIG. 8a illustrates 3 shims having a circular aperture each of which is bisected with a fin rotated at different angles. When stacked, the shims form a static mixer.
Figure 8B:
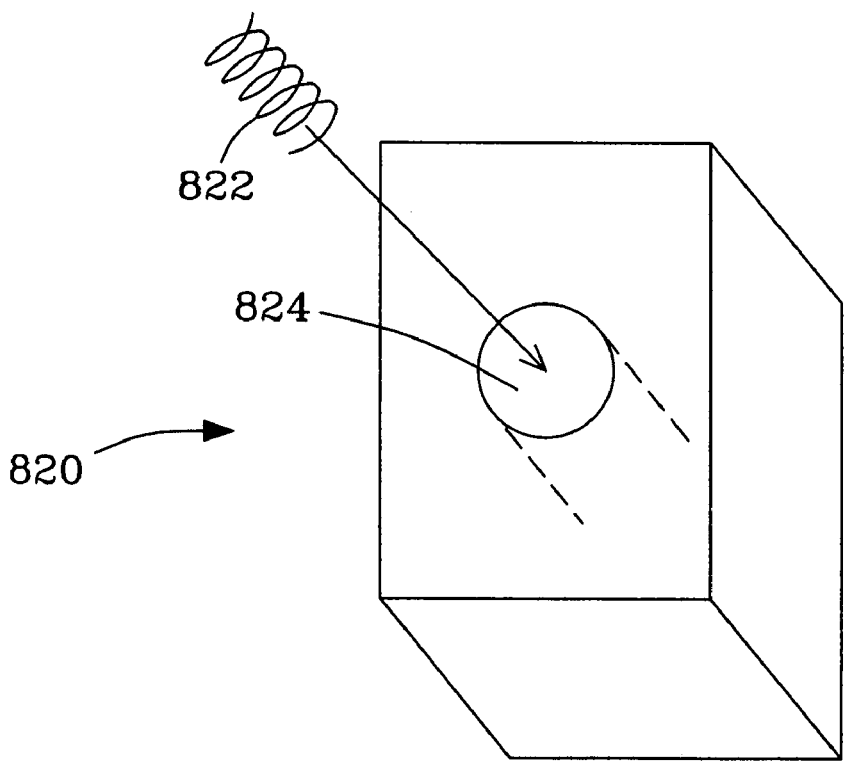
FIG. 8b illustrates a block with a cylindrical opening and a spiral-shaped insert that can be placed into the cylindrical opening to form a static mixer.

In another preferred embodiment, the invention provides a laminated device that includes a static mixer such as those illustrated in FIGS. 8a and 8b. FIG. 8a shows three shims 802, 804, and 806. Each shim has an aperture 808 that is divided in half by a strip 812. The illustrated shims show a centrally located strip; however it should be appreciated that the strip could be any protuberance in the aperture and need not be centrally located. For good mixing, any protuberance should project at least 5% across the diameter of the aperture. The protuberance(s) (including strip(s)) should be in different locations on at least 3 shims that are bonded together such that the apertures form a flow path. Preferably, the at least 3 shims should be adjacent. FIG. 8b illustrates another mixer 820 in which a mixing insert, such as spring 822, is inserted into a hole 824 in a laminated device. Preferably, the laminated device is formed by the ortho method. The mixing insert can be any structure that causes flow streams to cross and thus mix, preferred structures are helical, double helical, spriral, alternating spiral patterns, and the like.

Preferred materials for the shims are plastic, metal, ceramic, glasses and composites, depending on the desired characteristics. In some preferred embodiments, the shims are made of a nonporous material, although they could alternately be constructed with a porous or partially porous material. The presence of apertures for fluid flow and unit operations has been emphasized; however, it should be recognized that the shims may also contain additional features such as headers and connectors (for example inlets and outlets to fluid conduits) for connecting the inventive devices to other devices, fluid sources, reactors, etc., and alignment holes that are used to align shims prior to bonding. Additionally, components (such as, but not limited to, catalysts, mixers and sorbents) can be inserted into the apertures. In some preferred embodiments, the area of each individual aperture (such as an aperture that defines the boundary of a flow path) is less than 20 cm$^2$; and in some embodiments, the area of each individual aperture is in the range of $10^{-8}$ to $10^{-2}$ m$^2$. As an example an aperature could be as large as 80 cm wide and 0.25 cm thick, or much smaller.

The aperture-containing shims can be formed by processes including: conventional machining, wire EDM, laser cutting, photochemical machining, electrochemical machining, molding, water jet, stamping, etching (for example, chemical, photochemical and plasma etch) and combinations thereof. For low cost, stamping is especially desirable. The shims may be joined together by diffusion bonding methods such as a ram press or a HIP chamber. They may also be joined together by reactive metal bonding or other methods that create a face seal. Shims also may be joined by laser welding. Devices could alternatively be joined by the use of adhesives. In preferred embodiments, devices are laminated in a single step, in less preferred embodiments, a first set of shims is bonded together and subsequently bonded to a second (or more) set of shims. In some preferred embodiments, a set of shims are bonded together in a single step and then the resulting bonded article is cut into multiple devices.

The ortho design can be utilized to produce a multitude of integrated devices. Some nonlimiting examples of devices, include: chemical reactors (such as a steam reformer, integrated reformer/combustor, etc.), apparatus for phase change such as condensers or vaporizers, chemical separators such as distillation apparatus, temperature or pressure swing adsorption, and selective membrane separations, and chemical detectors or analyzers. Fluid passages may contain materials such as catalysts (in some preferred embodiments catalysts of two different types are disposed in adjacent fluid passages), adsorbents, absorbents, and heat exchange fluids (such as water, liquid metals, etc.). Thus there are a plethora of materials that could be disposed in the fluid passages. Examples of just a few such materials that could be used in the fluid passages include metal films (such as comprising Ni, Pd, etc.) and catalyst metals on a metal or oxide support. In some preferred embodiments, there are one, two or more heat exchange fluid passages (which, during operation, would contain a heat exchange fluid) adjacent one, two or more fluid passages containing catalysts, adsorbents, or absorbents. In some preferred embodiments, an exothermic reaction is conducted in one fluid passage while an endothermic reaction is conducted in an adjacent fluid passage.

For simplicity and ease of construction, in some preferred embodiments, devices are made with 30 or less, more preferably 10 or less, different shim designs. In some preferred embodiments, flow through every part of the device is substantially in the ortho direction (except for headers and footers). In other designs, a device contains both ortho and non-ortho flow paths. In some preferred embodiments, ortho and non-ortho paths are separate flow paths. In some other embodiments, the same flow path contains sections of ortho flow through at least 3 (or at least 5) adjacent shims and non-ortho flow through at least 1 (or at least 3 adjacent) shims. For example, in some devices there could be flow (alternatively stated, a flow path) through at least 3 (or at least 5) adjacent shims in the ortho direction, followed by flow in a non-ortho direction through at least 1 (or at least 3 adjacent) shims, and again flow through at least 3 (or at least 5) adjacent shims in the ortho direction.

The invention can also be characterized by certain properties, such as the ability to withstand pressure differences between internal fluid passages. For example, a high pressure vaporizer is operating with a 272 psig pressure differential and at temperatures exceeding 210° C. that is separated by only a 500 micron thick wall made entirely of stainless steel 316. Pressure containment is enabled by the use of microchannels with offset ribs and rounded edges. Thus, in some preferred embodiments, the inventive devices or processes are characterized by the ability to withstand and/or operate at pressure differences, between adjacent channels, of at least 100 psig (pounds per square inch gauge) per 1000 micron of web thickness separating the channels, more preferably at least 200 psig/1000 micron, still more preferably at least 500 psig/1000 micron. Design features such as rounded edges and/or offsetting supports are useful in withstanding such pressure differences.

The invention also provides processes using any of the designs described herein. A list of nonlimiting examples of processes, includes: distilling, reacting, adsorbing, heating, cooling, compressing, expanding, separating, absorbing, vaporizing, condensing, and combinations of these. Examples of catalysts, reactions, process conditions and parameters (such as productivities) and reactor types that can also be applied in the context of the present invention are described in U.S. Pat. No. 6,680,044 which is incorporated herein as if reproduced below.

EXAMPLES

Example 1

An integrated endothermic reaction and exothermic reaction reactor 300 was designed using the ortho shim style, where the flow is substantially parallel to the thickness of the shim. A shim is defined as a thin slice of metal, plastic, ceramic, or composite material. The thickness of the shim may range from 50 microns to 5000 microns. A preferred range of shim thickness is 250 microns to 2000 microns. Microchannels can be formed by assembling shims with aligned features. A feature is a cut-out in the shim that include shapes such as, but not limited to: circles, squares, rectangles, parallelograms, waves, irregular shapes, shapes with rounded corners, triangles and combinations thereof.

Figure 7A:
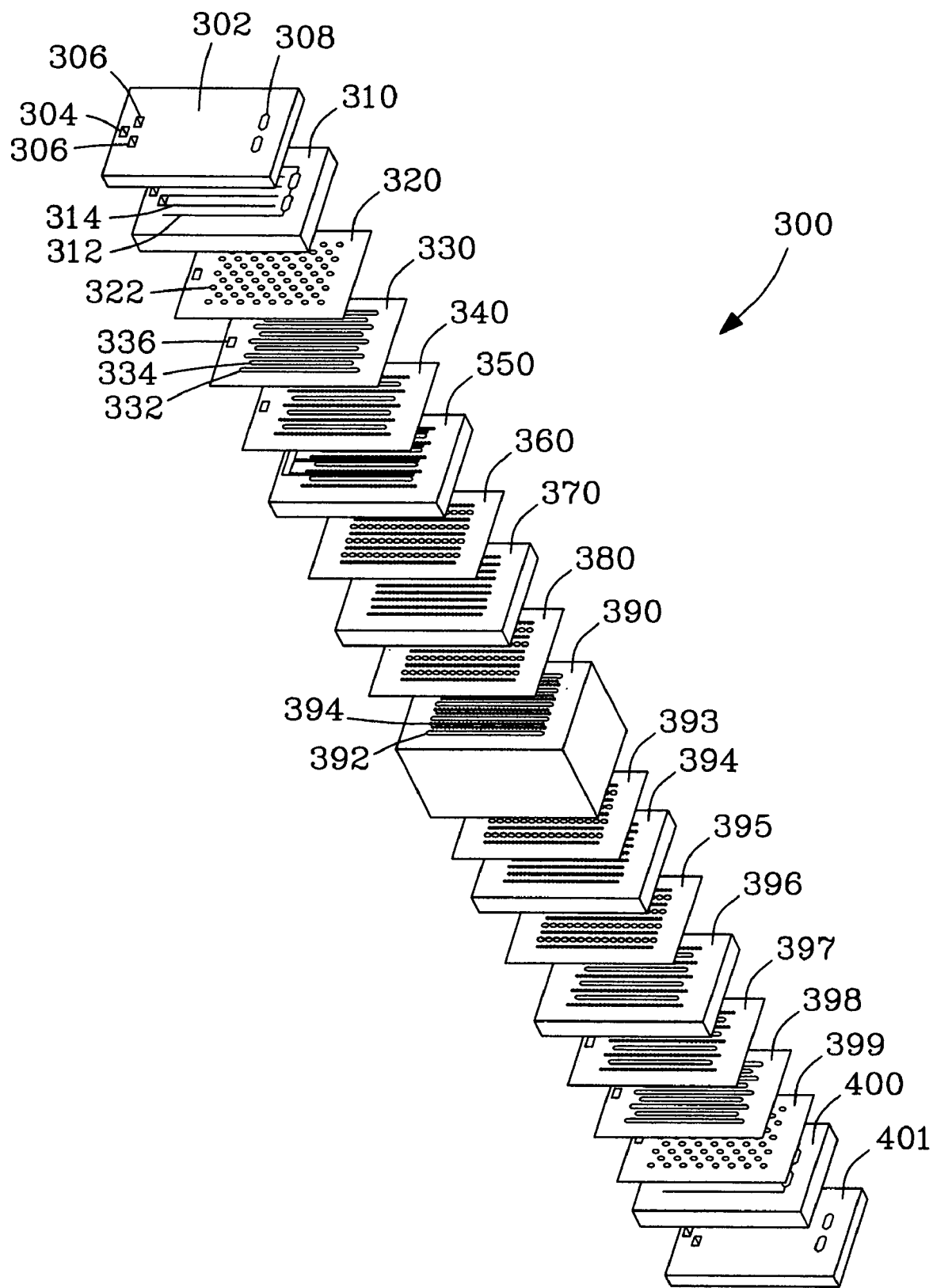
FIG. 7a is an exploded view of a reactor formed from shims.
Figure 7B:
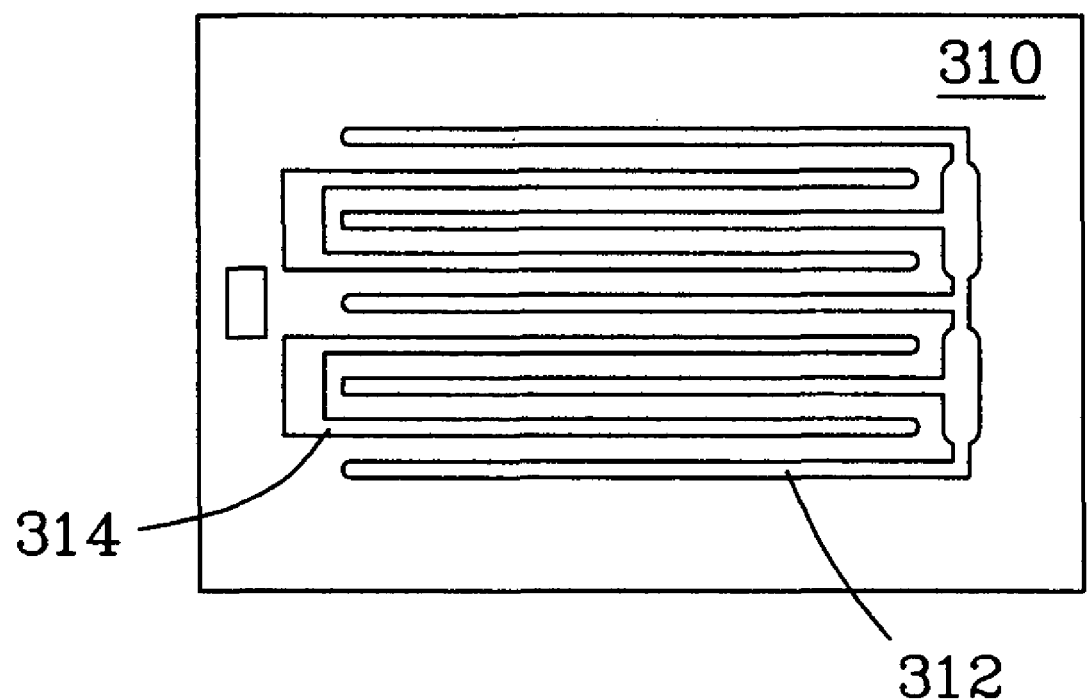
Figure 7B:
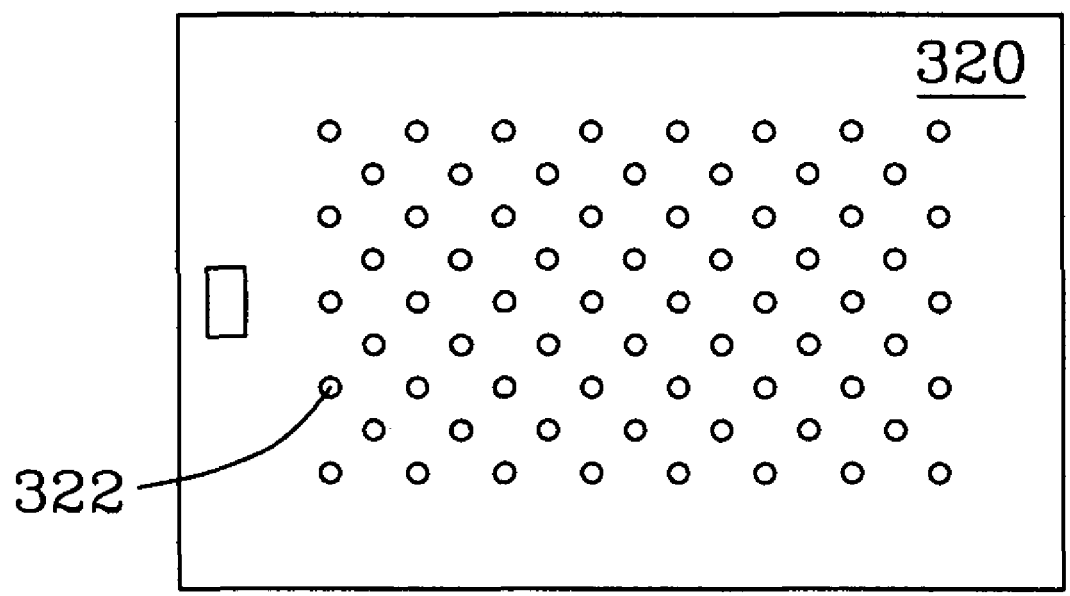
Figure 7C:
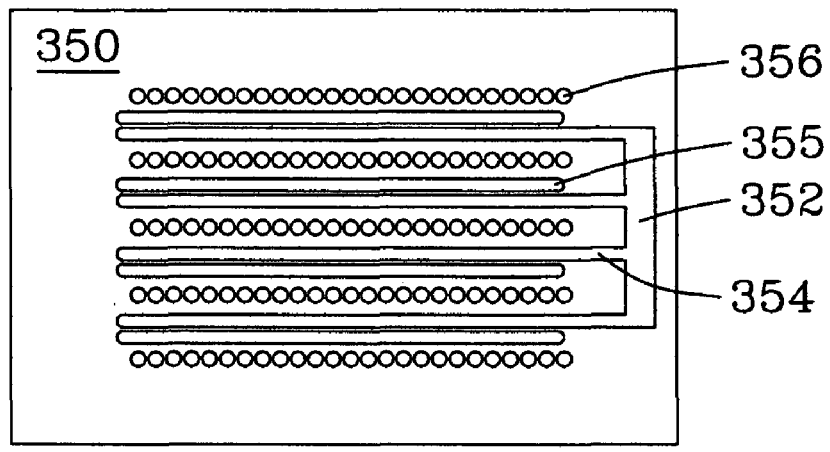
Figure 7C:
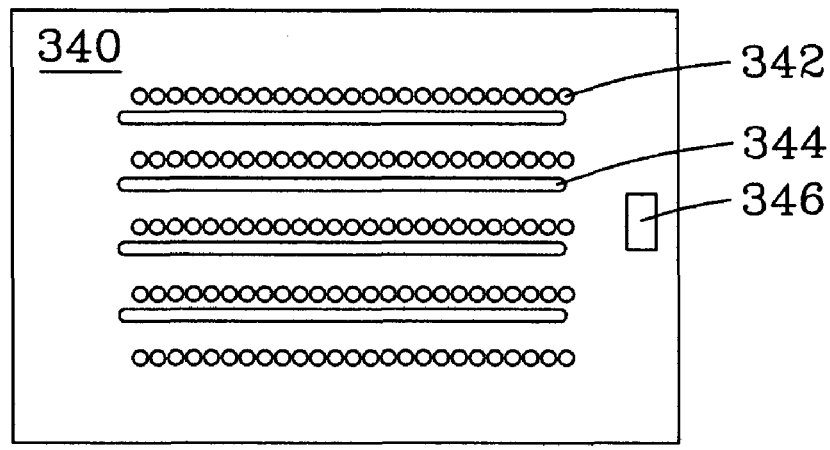
Figure 7C:
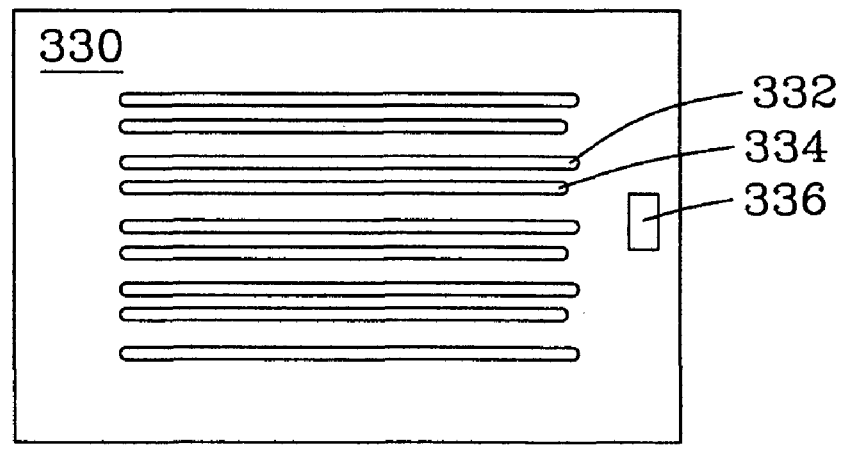
Figure 7D:
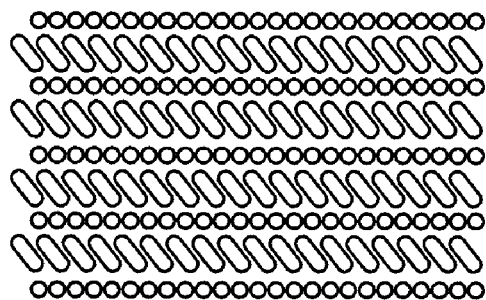
Figure 7D:
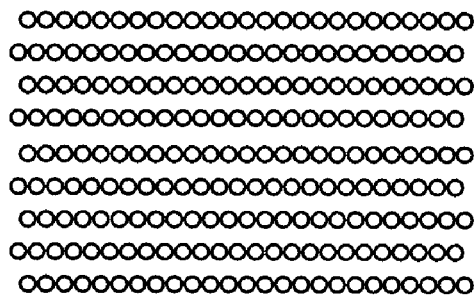
Figure 7D:
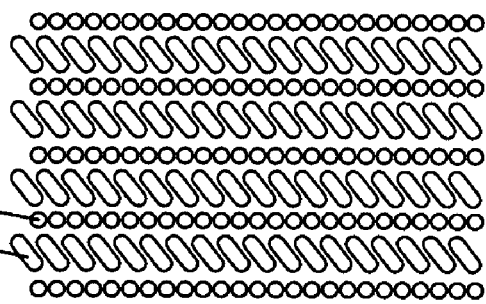

The basic design of the ortho-style integrated endothermic and exothermic reactor is shown in FIG. 7a. The features cut in this shim are slots and holes. After alignment of 230 shims each 0.02 inch (0.05 cm) thick, five slots are formed for the endothermic reaction chamber. Some of these shims are used outside the reaction section to manifold and align flow stream. Each reaction slot is 1.5 inches (3.8 cm) wide and 2 inches (5 cm) long. Within this slot, a catalyst in inserted from the side after machining open access slots. Also formed after alignment and joining of the shims, are 5.1 cm long holes for the exothermic reaction. This geometry is selected to allow for an interstream pressure differential where the exothermic reaction, such as combustion, operates at lower pressure in the holes than the endothermic reaction in the slots. One example of an endothermic reaction for use in this design is methane steam reforming. A combustion catalyst may be optionally inserted or coated on the walls of the holes. Alternate designs could allow for catalyst insertion after bonding. Only one shim design is required to create the core of the reactor. Additional shims manifold and connect the flows from inlet pipes to the slots or holes within the reactor. The shims and corresponding features and flows are described starting from the connection to inlet pipes.

The cover shim 302 has separate openings for both reactants of the exothermic reaction, such as a fuel and air. The cover shim also contains an opening for the endothermic reaction mixture. The left most opening is for the fuel. Moving to the right, the next two openings 306 are for the air. The two openings 308 on the right hand side of the cover shim are for the endothermic reaction mixture. Tubing connections for each of the three streams may be welded on this cover shim. The thickness of this shim or cover plate is 0.25 inches (0.64 cm).

The next shim 310 is used for flow distribution. The shim 310 is composed of 20 shims of 0.02 inch (0.05 cm) thickness each. The fuel passes through this shim to the next adjacent shim. Both the air and endothermic reaction mixture flow laterally within this grouping of like shims to spread the flow evenly across the shim face. Air and an endothermic reaction mixture flow through alternating channels 312, 314.

Shim 320 is used for flow distribution. The shim 320 is composed of 1 shim of 0.02 inch (0.05 cm) thickness. The fuel passes through this shim to the next adjacent shim. The small holes 322 represent an orifice plate to provide sufficient back pressure to evenly distribute the fluids in the adjoining shims Shim 330 comprises slots 332, 334 for both the air and endothermic reaction mixture. The flow is now more evenly distributed across each slot. Also contained in this shim is a through hole for the combustion fuel. The shim 330 is composed of 1 shim of 0.02 inch (0.05 cm) thickness.

Shim 340 contains holes and slots. The endothermic reaction mixture flows from slots 332 in shim 330 into holes 342 in this shim. Holes are used to better contain the high pressure stream. The combustion air continues to flow in slots 344. The combustion fuel continues to flow through the through holes 346 in the right hand side of the shim. The shim 340 is composed of 1 shim of 0.02 inch (0.05 cm) thickness.

Shim 350 is used to distribute fuel across the face of the shim. Fuel flows from the opening 352 on the right side of the shim and distributes through the slots 354 that are adjacent to the air slots 355. The endothermic reaction mixture continues to flow through holes 352. The shim 350 is composed of 20 shims of 0.02 inch (0.05 cm) thickness each.

Shim 360 is used for mixing the fuel and combustion air. Mixing occurs in the oblong short slots 362 that overlay the fuel slot 354 and air slot 355. The endothermic reaction mixture continues to flow through holes 366. The shim 360 is composed of 1 shim of 0.02 inch (0.05 cm) thickness.

Shim 370 is used to reduce the flow opening of the combustion stream to near or below the quench diameter to minimize homogeneous flame combustion. The shim 370 is composed of 20 shims of 0.02 inch (0.05 cm) thickness each.

Shim 380 is identical in design to shim 360. The shim 380 is composed of 1 shim of 0.02 inch (0.05 cm) thickness.

The endothermic reaction mixture expands from the holes to the slots within the reactor section 390. Slots 392 are preferred for ease of insertion of the reaction catalyst. After bonding the block, side grooves are machined to open up each of the reaction slots. The catalyst is then inserted from either side and the slots are resealed with a side plate to create a hermetic seal to the environment on the side of the device. The combustion reaction occurs in the double row of holes 394 that are interspersed between endothermic reaction slots. Holes are selected to minimize metal stresses from a high pressure differential between the streams. This pressure differential may, for example, range from 0.1 to 900 atm. A preferred range is 2-100 atm. Double rows of combustion holes are used to create more flow and reaction area for the combustion stream. This acts to give more time for reaction and reduce the combustion stream pressure drop. The reactor 390 is composed of 100 shims of 0.02 inch (0.05 cm) thickness each to create a 2 inch (5 cm) reactor flow length.

The size of the reactor shim holes were 0.04" (0.1 cm) in diameter and the slot gap was 0.035" (0.089 cm) through which the catalyst is inserted or coated and reacting flow is converted to products. The width of the slot is 1.5" (3.8 cm), although it can be any width in this design.

Shim 400 is the same as shim 380. The reactor effluent, or product, flows from the slots into the holes. The combustion effluent flows from the double row of holes into oblong slots. The same shim design was used here to minimize the number of unique shim designs.

Shim 410 is the same as shim 370. A different shim design could have been used to improve the performance of the device, such as pressure drop, however symmetric shims were selected to reduce the number of unique shims and to reduce potential errors from stacking and aligning shims.

Shim 420 is the same as shim 360.

Shim 430 is the same as shim 350 except that there is no slot for the combustion fuel. The fuel was mixed with the air in shim 350 and consumed or nearly consumed in the reactor.

The remaining shims are the same as shims 340, 330, 320, 310, and 302 respectively except without fuel holes. Equal shim thickness and numbers of shims are used as shims 340 to 302 to create a near symmetric device. This reduces fabrication time and cost.

The catalyst used in the reformer channels, for the case of methane steam reforming in the slots and combustion in the holes to provide the endothermic reaction heat, contained a catalyst of 13.8%-Rh/6%-MgO/$Al_2O_3$ on a metal felt of FeCrAlY alloy obtained from Technetics, Deland, Fla. The reforming catalysts were prepared using a wash-coating technique based on FeCrAlY felt with 0.01" thickness and 90% porosity. Before wash coating, metal felt was pretreated by a rapid heating to 900° C. in air for 2 hours. To enhance the adhesion between the metal surface and the catalyst, a dense and pinhole-free interfacial layer was first coated onto the oxidized FeCrAlY felt by metal organic chemical vapor deposition (MOCVD). This interfacial layer can be $Al_2O_3$, $Al_2O_3+SiO_2$, or $TiO_2$, etc. For example, when $TiO_2$ was coated, titanium isopropoxide (Strem Chemical, Newburyport, Mass.) was vapor deposited at a temperature ranging from 250 to 900° C. at a pressure of 0.1 to 100 torr. Titania coatings with excellent adhesion to the foam were obtained at a deposition temperature of 600° C. and a reactor pressure of 3 torr. This layer not only increases the adhesion between metal felt and the catalyst, it also protects the FeCrAlY from corrosion during the steam reforming reaction. 13.8 wt % Rh6 wt % MgO/$Al_2O_3$ powdered catalyst was prepared by 1) calcining a high surface area gamma-alumina at 500° C. for 5 hours; 2) impregnating the gamma alumina with MgO using the incipient wetness method with an aqueous solution of magnesium nitrate; and obtaining an MgO modified gamma alumina support; 3) drying the modified support at 110° C. for 4 hours followed by 4) a second calcination at 900° C. for 2 hours; 5) impregnating the modified support with $Rh_2O_3$ with the incipient wetness method from a rhodium nitrate solution; 6) followed by a final drying at 110° C. for 4 hours and a 7) final calcinations at 500° C. for 3 hours to obtain a powder of the supported catalyst. Catalyst coating slurry was prepared by mixing powder catalyst aforementioned with de-ionized water in the ratio of 1:6. The mixture was ball-milled for 24 hours to obtain coating slurry containing catalyst particles less than 1 micron. The heat-treated and CVD coated felt was wash-coated by dipping the felt into catalyst slurry. The wash coating process may be repeated to obtain desired weight gain. Between each coating, the felt coated with catalyst was dried in an oven at 100° C. for 1 hour. The coating procedure is repeated to achieve desired coating thickness or catalyst loading. After the final coating step, the catalyst was dried overnight in an oven at 100° C. and calcined by heating slowly in air at rate of 2° C./min to a temperature in the range of 300 to 500° C. The amount of catalyst coated was measured to be 0.1 gram catalyst per square inch (6.5 $cm^2$) of felt. Prior to steam reforming testing, the engineered catalyst felt was subjected to an activation treatment, preferably reduction at 300-400° C.

The integrated combustion catalyst can be a wash-coated catalyst that is applied directly to the interior Inconel walls of the ICR device. The Inconel surface is first cleaned, ultrasonically if possible, in hexane, nitric acid (20%) and acetone (or propanol). Preferably, the cleaning solutions are flowed over the Inconel surfaces. A native chromium oxide layer is then formed on the Inconel surface by heating in air (flowing, if possible) at 3.5° C./min to 500° C., and held at 500° C. for 2 hours. The temperature is then increased at 3.5° C./min to 950° C., and held at 950° C. for 2 hours. The Inconel is then allowed to cool to room temperature at a rate no faster than 5° C./min. The active palladium component is then applied to the chromia layer by submersing the required deposition area in a 10-wt % solution of palladium nitrate. This is accomplished either by static submersion, or by pumping the fluid into a device to a required liquid level. The solution is then allowed to remain in contact with the deposition surface for 2 minutes. The solution is then removed from contact with the Inconel surface, and the amount of palladium remaining is calculated through a difference measurement. In the case of channel coating, nitrogen is flowed through the channel do ensure no plugging occurs. The catalyst is then dried at 100° C. for one hour, under vacuum if possible. The catalyst is then calcined by heating at 3.5° C./min to 850° C., held at 850° C. for 1 hour. The catalyst is then allowed to cool to room temperature at a rate no greater than 5° C./min.

Example 2

A high pressure vaporizer 200 was constructed that uses a flow of hot air to heat and partially vaporize water flowing in the countercurrent direction. The water is pressurized to 20 atmospheres while the air is at nearly atmospheric pressure. Design flow rates are 20 mL/minute of water at 280 psig inlet and an inlet temperature of 210° C. and 247 SLPM of air at slightly above atmospheric pressure (8 psig inlet) and an inlet temperature of 279° C. Nominal operating temperature is 215° C. The design point for steam quality at the outlet is 50%.

The central area of the vaporizer contained 1.7 inches (4.3 cm) thick stack of identical shims 210, each having a thickness of 0.010" (0.025 cm). The individual channels in a shim are offset half their width from the channels below and above. Since every other layer is at higher pressure, this provides load support with a reduced number of supports 214 (where a support 214 (or alternately called a rib) is defined as the material between channels in the direction of width (that is, the distance within a shim between channels as measured in the direction of longest dimension of each channel, or, where there is not a longest dimension, in the shortest dimension that is perpendicular to thickness), but not including the web thickness that is disposed between channels in the direction of height). For the same stress, each channel is wider than it would be with aligned support webs. This provides more open area to reduce pressure drop, fouling and minimizes required thickness between layers reducing resistance to conductive heat transfer.

The features in the main body were created by photochemically etching through a flat piece of stainless steel 316 material. Feature creation in the ortho direction allows a full radius at the end of a slot to reduce stress concentration as compared to a square or filleted corner. The full radius features also minimize possibility of re-circulation zones in the water flow, which could increase surface deposits which cause fouling.

Water flows from the inlet header 202 through the channels to the outlet header 204. For water, there are 17 layers 216 of 6 identical channels. For air, there are 18 layers 218. Each air flow layer 218 has 5 identical channels with 2 half-width channels at each side. Between layers 216 and 218 there is a web layer 220. In this configuration, the height of each layer 216, 218 is the same as the height of each support 214 within each layer. The height of each channel is 0.6 mm and the web layer 220 extends over a distance of 0.76 mm between channels.

Two distribution plates are used divide the water flow into the vaporizer to achieve even flow distribution in the 102 water channels. The first plate 230 distributes the flow from the center inlet 215 through holes 227 biased toward the outside edges. Circles 225 indicate holes for thermocouples used in this test design, while circles 229 indicate inlet dimensions but do not represent features on plates 226 or 230. After flowing through the first set of holes, a second plate 226 distributes the flow in a pattern matching the channel layout. Balanced flow through the second plate is aligned with the solid webs between the channels, requiring the water to flow in relatively equal length, circuitous paths from the inlet to the channels.

The two-phase water/steam flow is collected in header space 241 in the footer 240 and exits through a central port 242. Orientation of the device is with this outlet at the top. A sloping (pent) roof shape 244 in the space from the channel exits to the outlet port eliminates pockets where vapor could collect and could cause pulsating flow of separated volumes of vapor and liquid.

In the vaporizer, air flows in a Z configuration—into a wedge shaped inlet manifold 203, through the 5 identical channels and 2 half-width channels, and through a wedge shaped outlet manifold 205. The wedge shape is in the interior of each inlet and outlet. The header and footer widths are chosen so that sum of the pressure drop at the inlet and outlet provides the same the flow rate through the full channels and the same in the two half channels. The headers and footers are designed such that air flow is equal through all the air flow channels (even when air enters in a direction that is not parallel to air flow through the body of the vaporizer). The air inlet/outlet header/footer design is shown in FIGS. 10e-10i. Air entering the shims from the right-hand side of the figures flows into air slots 1060 which are interleaved with liquid flow channels 1062. The header shims are stacked on the vaporizer body and arranged with the area of the air slots increasing in the direction toward the vaporizer body with greatest air inlet slot area nearest the air inlet. Because the shim pattern is reversed in the footer (with greatest air outlet slot area nearest the air outlet), air flow rate is equal in all channels through the vaporizer device. Air exits the opposite face from which it enters.

Figure 12:
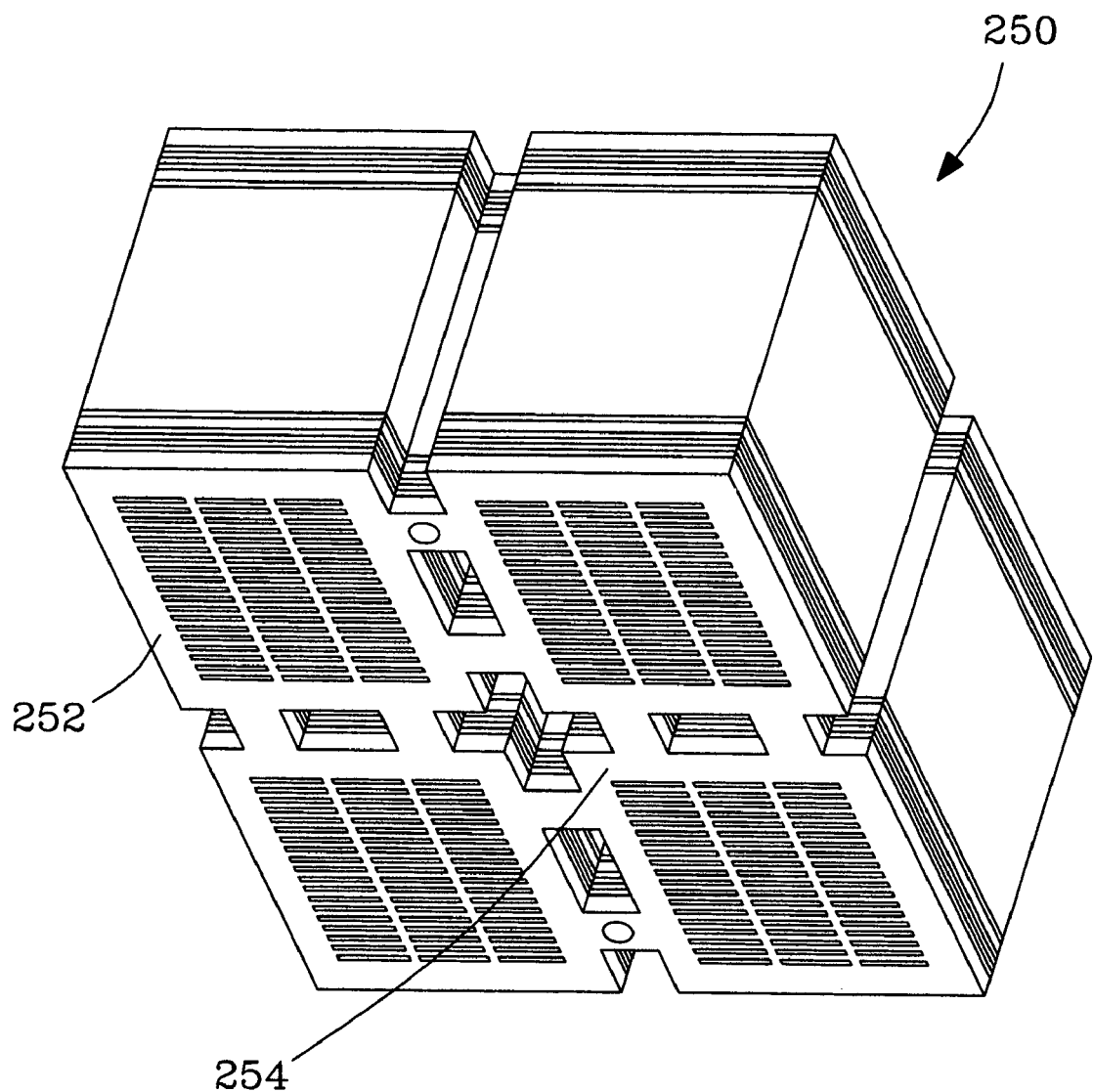
FIG. 12 shows a stack of 4 shim sets that can be cut to form 4 vaporizer bodies.

The body of the vaporizer was manufactured by photo-chemical machining flat metal shims with the desired channel shapes at each cross section then diffusion bonding an assembly into a solid volume. The shims were plated with a nickel phosphate interlayer, stacked in the correct order, and bonded under heat and pressure. After bonding, the body was machined to provide access to the air manifolds, then the air and water headers and footers were attached by welding. As shown in FIG. 12, each shim contains four identical sets of features. Four vaporizer bodies are made from each stack 250, which were then cut apart after bonding. There are 174 identical center shims, header shims (e.g., 252), and 33 shims (not shown) of 6 configurations form each air manifold section.

All air manifold shims were initially fabricated identically, then the unique feature for each configuration was electric-discharge-machined. End plates isolated the water channels from the air channels and provided a thicker solid section for welding headers and footers to the body.

Non-symmetric alignment holes keep identical shims in the same orientation to reduce misalignment. Alignment holes are electric-discharge-machined for improved precision.

The air manifold shims do not open to the outside of the device. A short end section must be machined away to allow the air to enter and exit. The air manifold shims have a narrow outer boundary to maintain shape during fabrication. After bonding, a pocket is machined to open up the layers for access. A heat relief groove is machined parallel to the sides where the air header and footer side plates are welded.

The water header and footer are welded to the body at the end plates. Full width side plates for air header and footer attachment are welded to the end plates and the body. These side plates eliminate welding along the shim bond seam. The air header and footer are then welded to the side plates.

Air flow testing was performed to measure velocity in each channel in a single layer to assess flow distribution and minimal deviation was observed. Performance testing has proceeded for over 5000 hours of operation.

Figure 11:
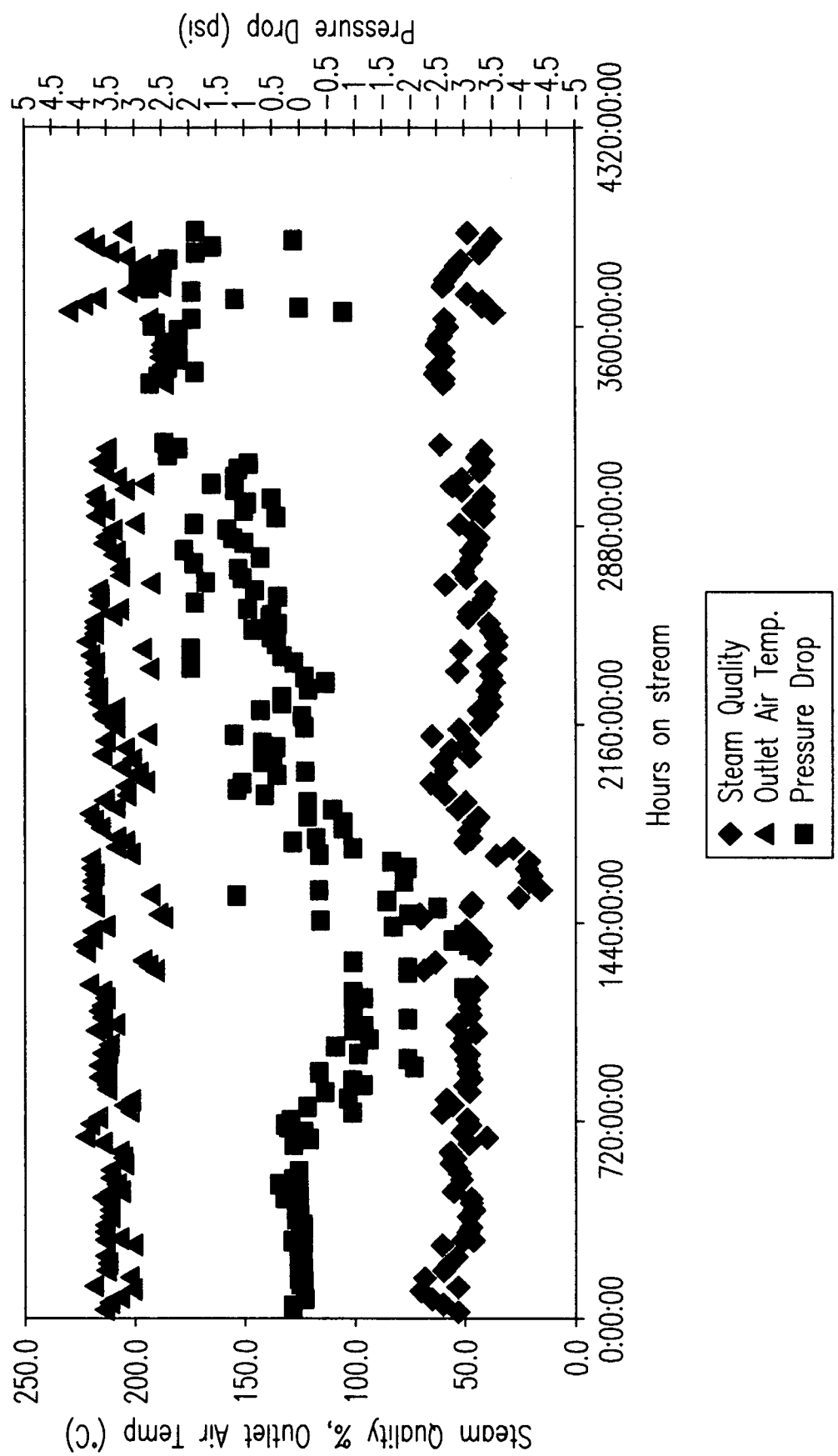
FIG. 11 is a graph of data of vaporizer performance as a function of time.

The high-pressure vaporizer continued to operate without signs of degradation at about 5000 hours (211 days), shown in FIG. 11. It operated at 44-46% steam quality and was fed with about 1.5 ppm total dissolved solids (TDS) water. The primary inorganic solid constituents in the water are Mg, Ca, and Si. These three solids are present in roughly 7%, 15%, and 2% respective concentration of the 1.5 total ppm solids. Data are shown in FIG. 11. Although the pressure drop slightly increased, there does not seem to be appreciable degradation due to the consistency of the outlet air temperature. The variability seen from ~3240 hrs to 3780 hrs was due to a problematic needle valve which made the pressure difficult to control. This system had experienced more than 10 process upsets without significant change in performance.

Air can be used to partially boil water to generate steam for chemical processing. Air was fed at 247 SLPM (standard liters per minute) and entered at 279° C. The average outlet air temperature was 212° C. The water flowrate is 20 mL/min. At these conditions 282 Watts of heat was transferred, or an average heat flux of 0.49 W/cm$^2$. On a volumetric basis, this heat is transferred within a core volume of 1.74 inches flow length by 1.985 inch high by 1.553 inch wide. Thus the volumetric heat flux is over 3.4 W/cm$^3$. The flow paths are countercurrent within the device, with water flowing up from the bottom and air down from the top. Measured heat losses were around 5% for this device.

No fouling was detected within the microchannel device after over 5000 hours. Fouling is measured via the outlet gas temperature. As scale builds up, the resistance to heat transfer in the channel increases and the outlet gas temperature is expected to increase, thus showing less heat that is transferred from the gas to the partially boiling water. The higher superficial velocity within the microchannels is anticipated to contribute to the reduce rate of fouling as compared to conventional boilers.

Example 3

Figure 10A:
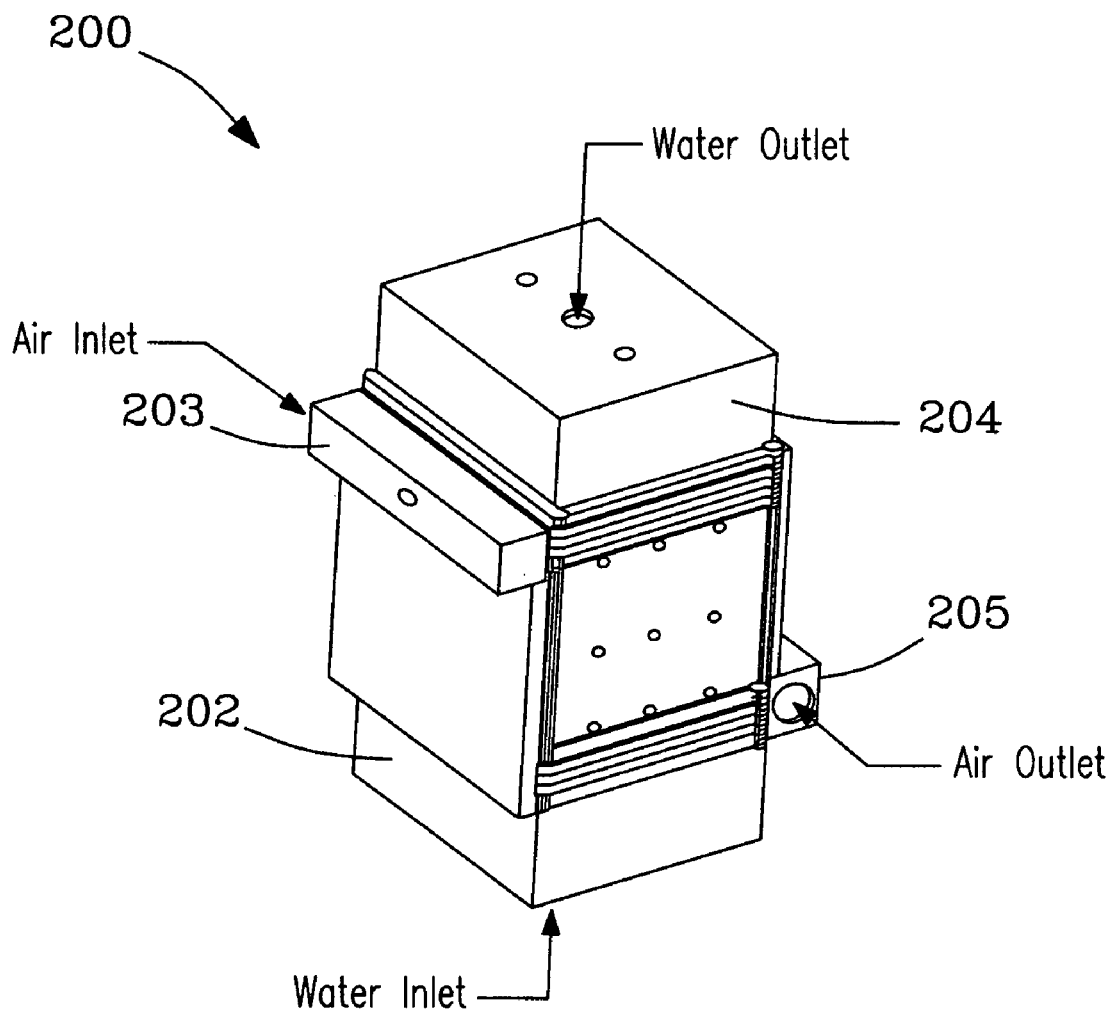
FIG. 10a illustrates a vaporizer device.
Figure 10B:
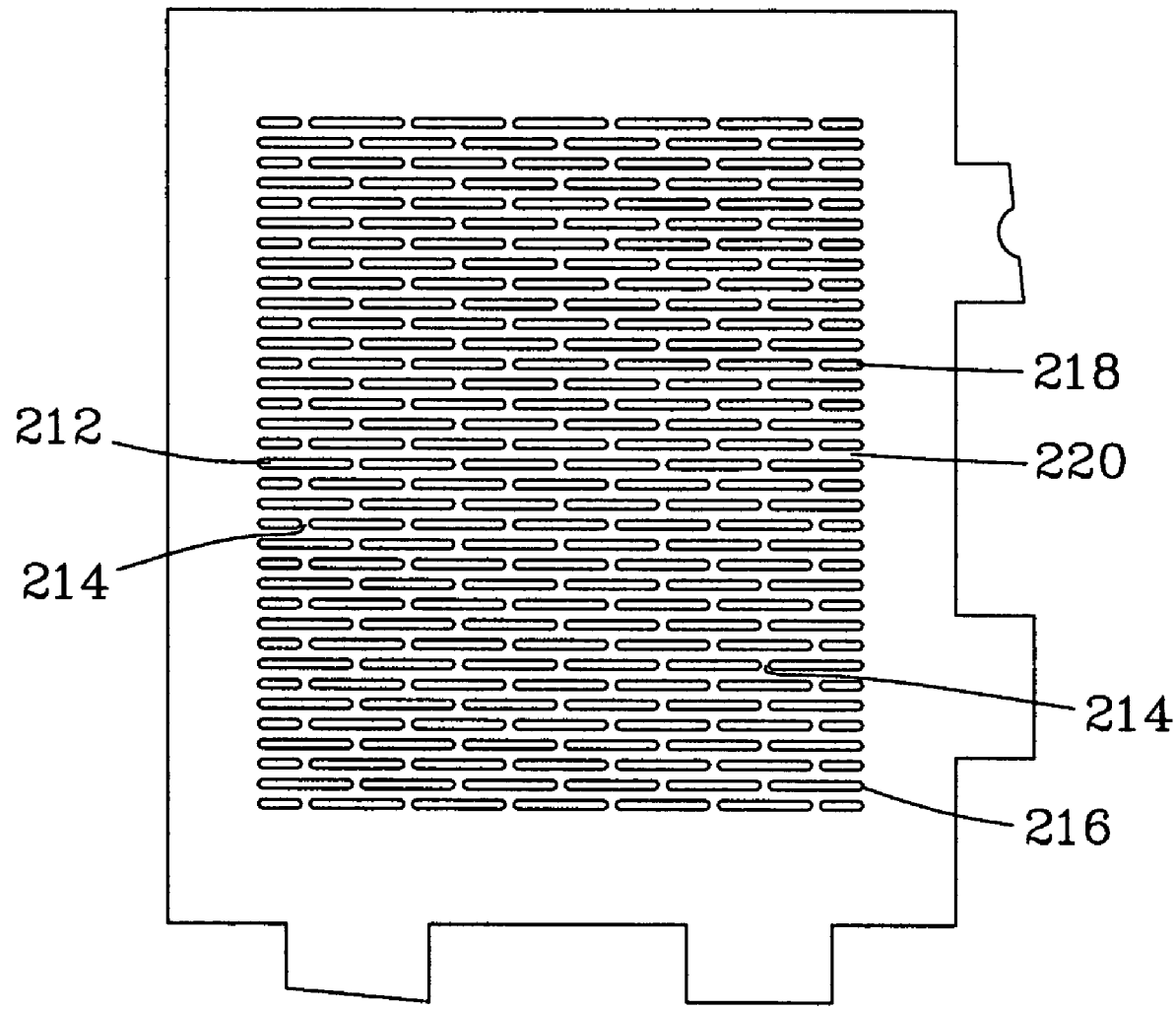
FIG. 10b illustrates a shim that can be repeatedly stacked to form a vaporizer body.
Figure 10C:
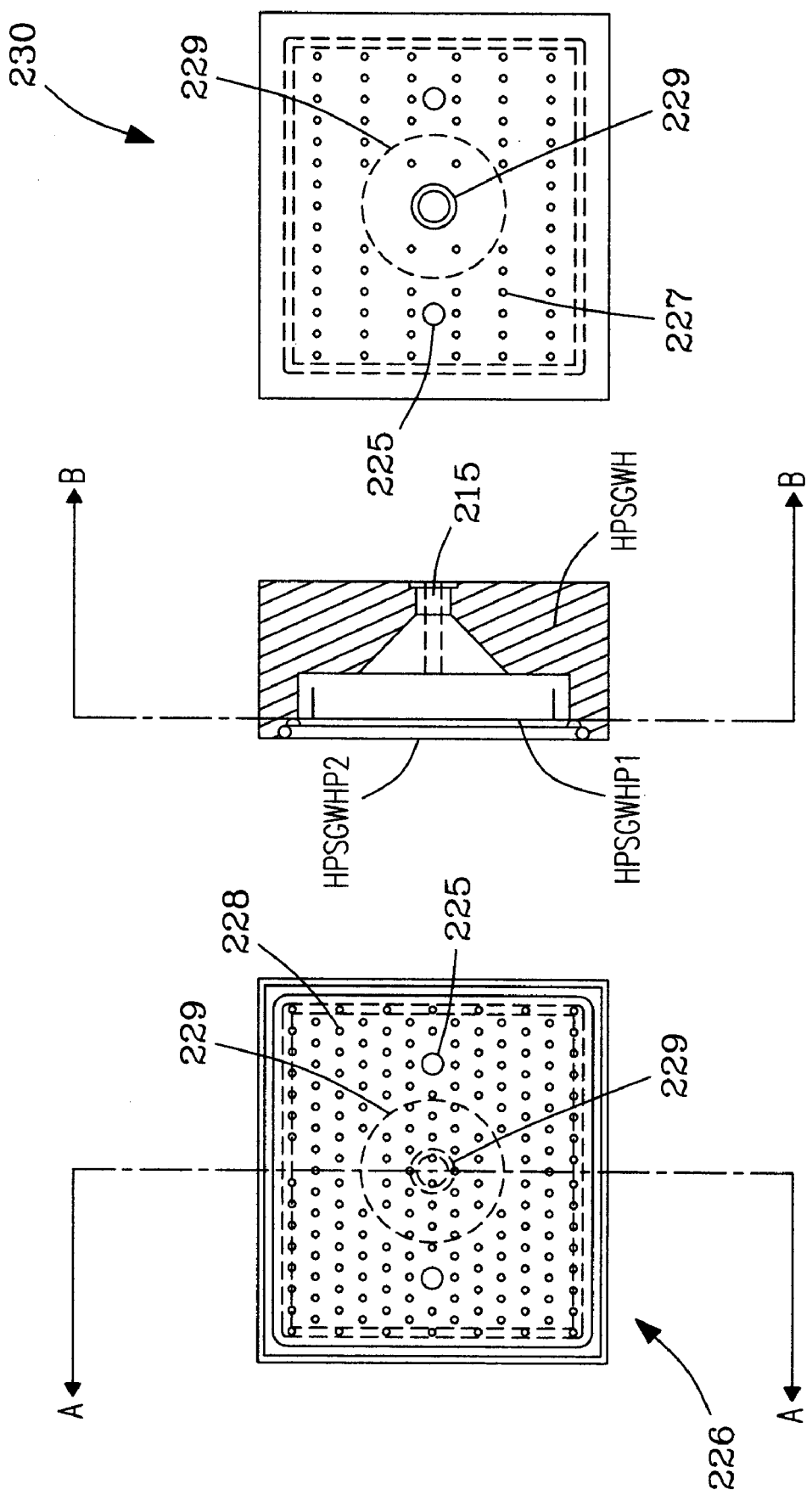
FIG. 10c illustrates shims used to form a header for directing liquid water into a vaporizer body.
Figure 10D:
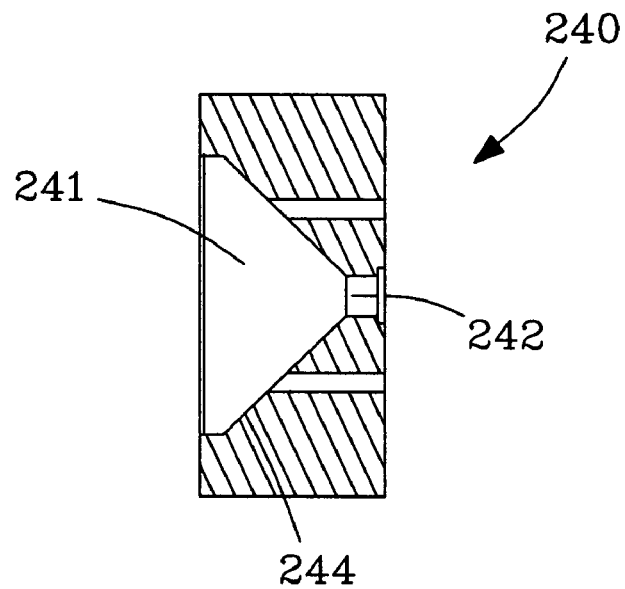
FIG. 10d illustrates shims used to form a footer for collecting water vapor from a vaporizer body.
Figure 10E:
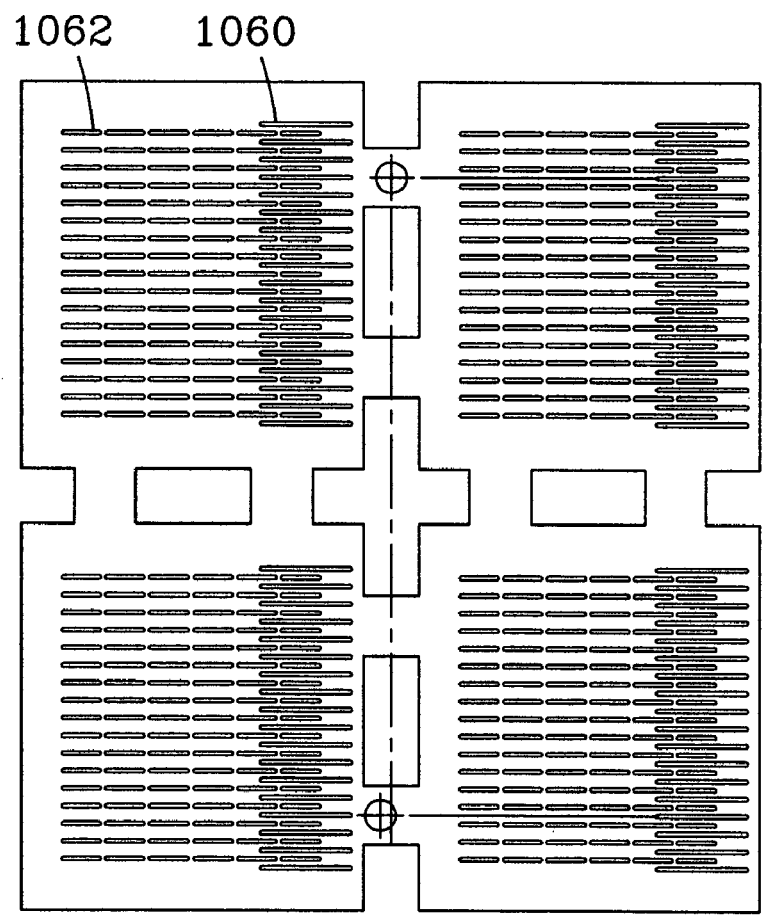
FIGS. 10e-10i illustrate a header and/or footer design that could be used for an air inlet and/or outlet in a vaporizer.
Figure 10F:
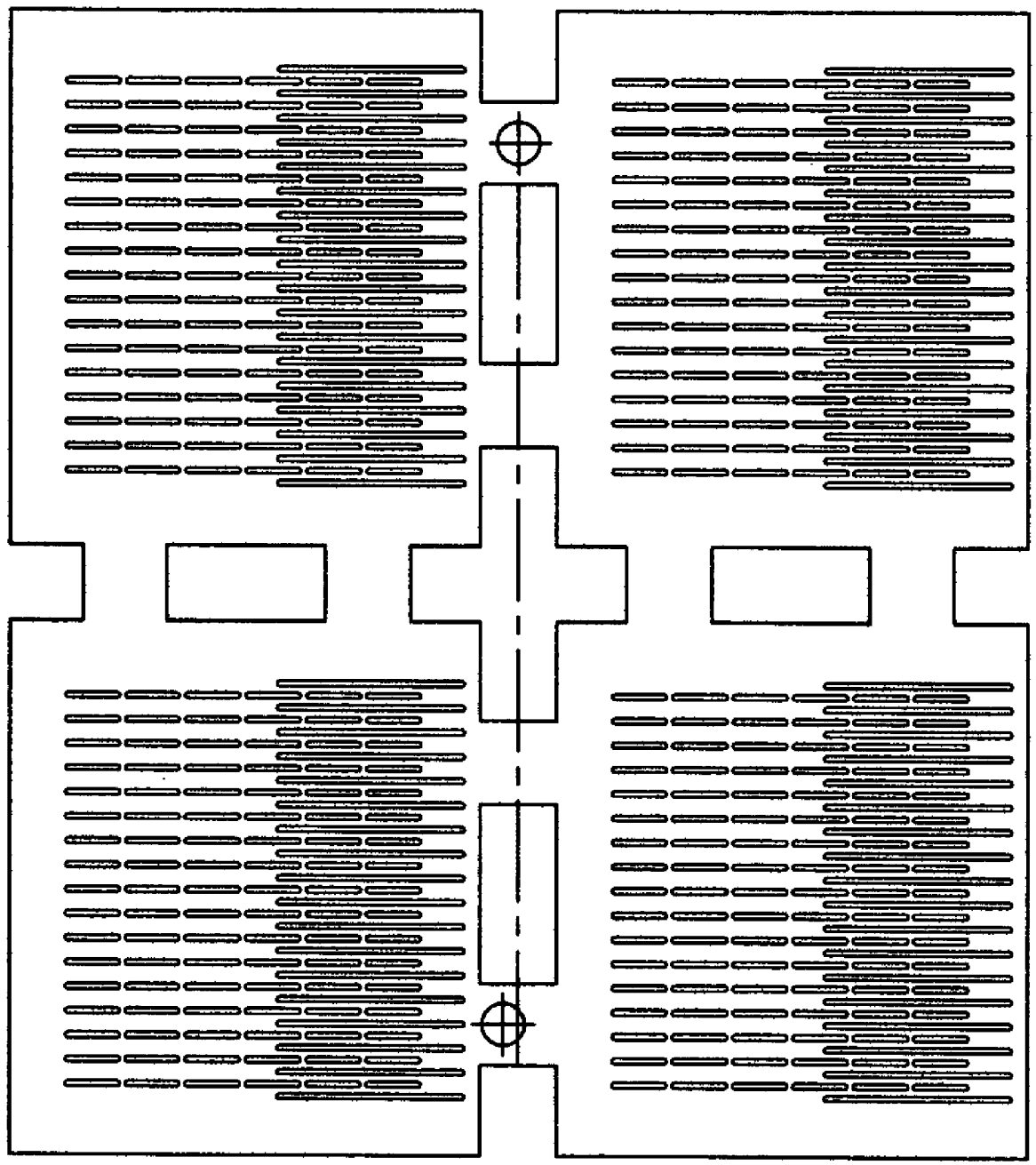
Figure 10G:
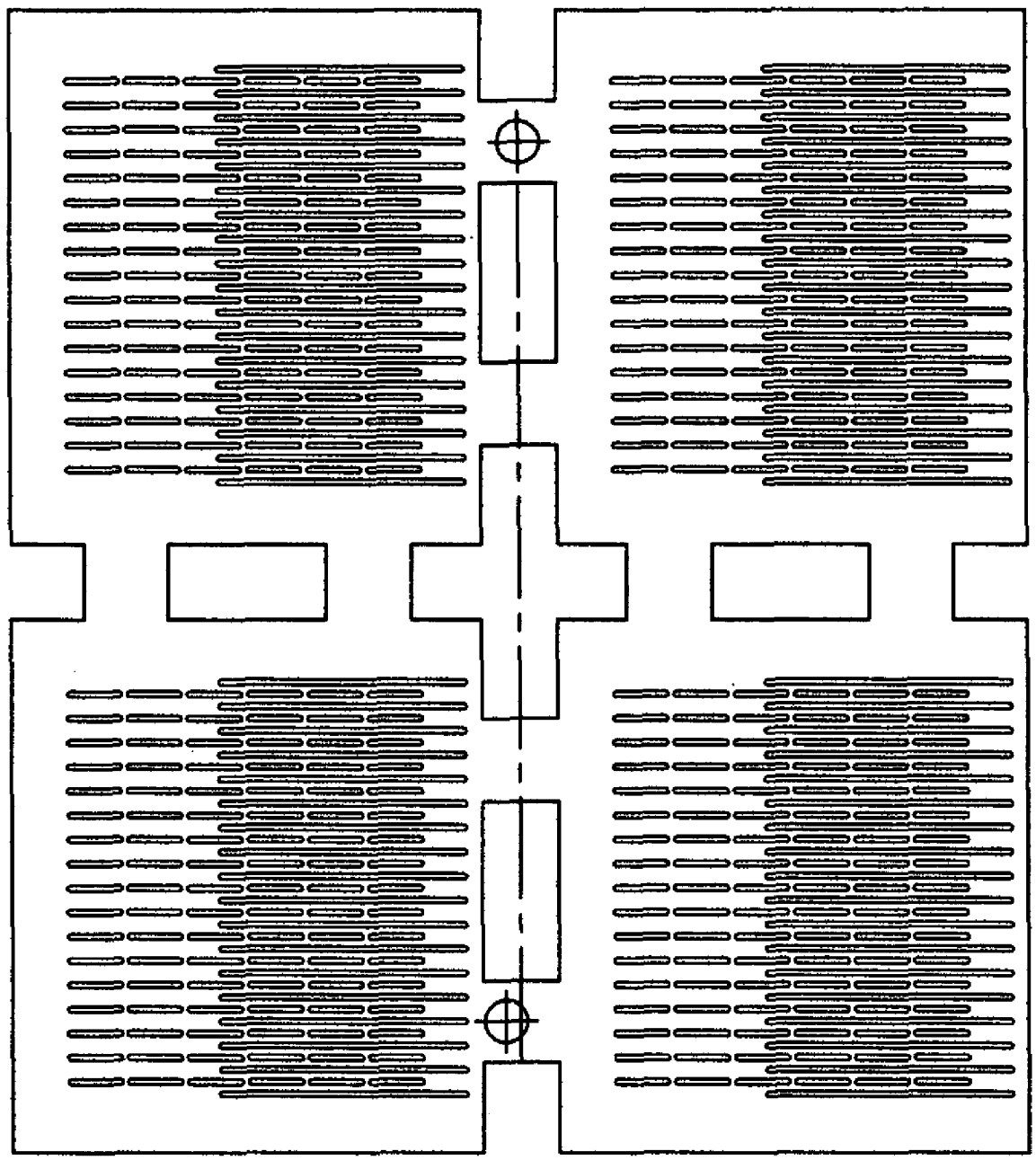
Figure 10H:
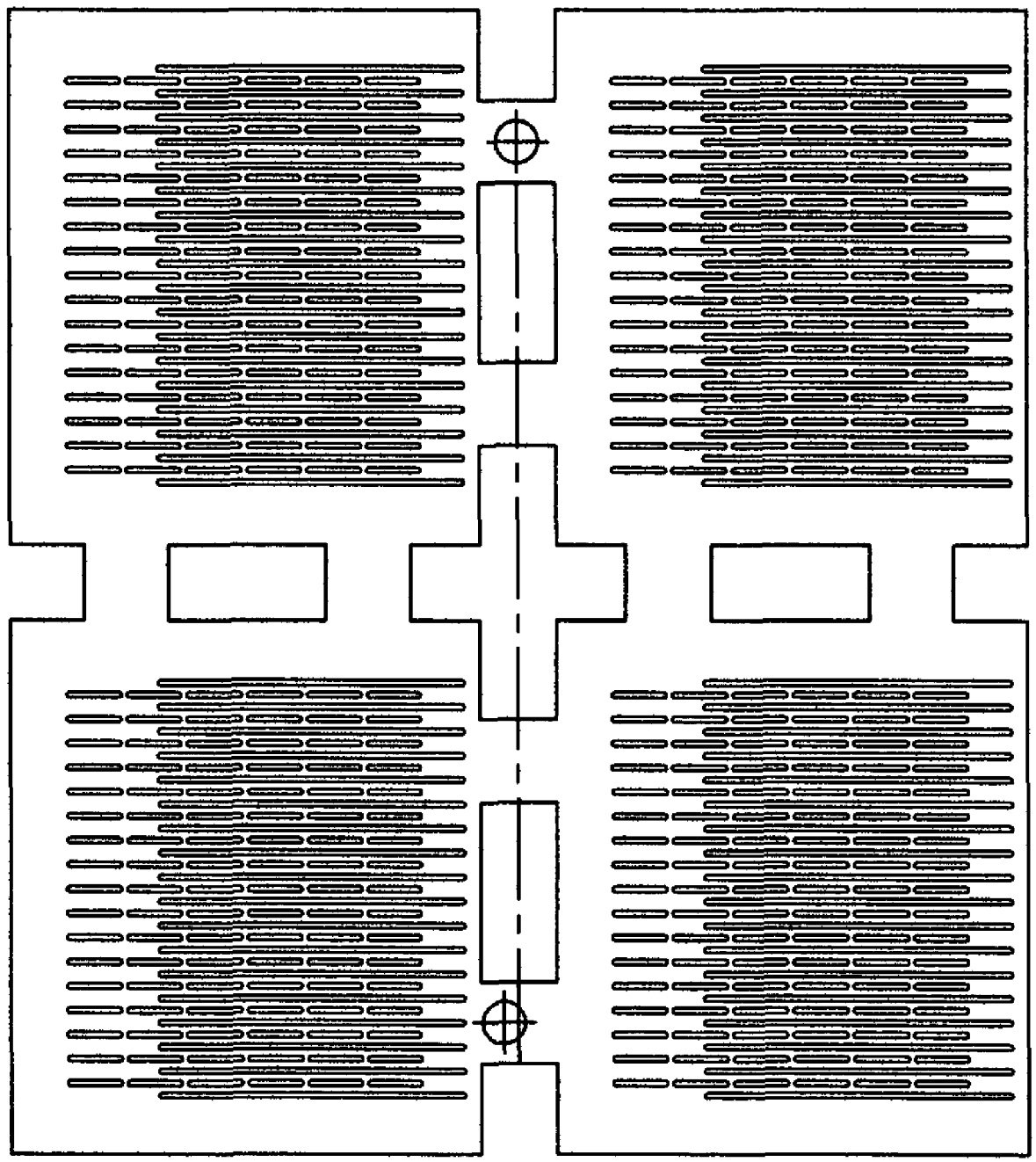
Figure 10I:
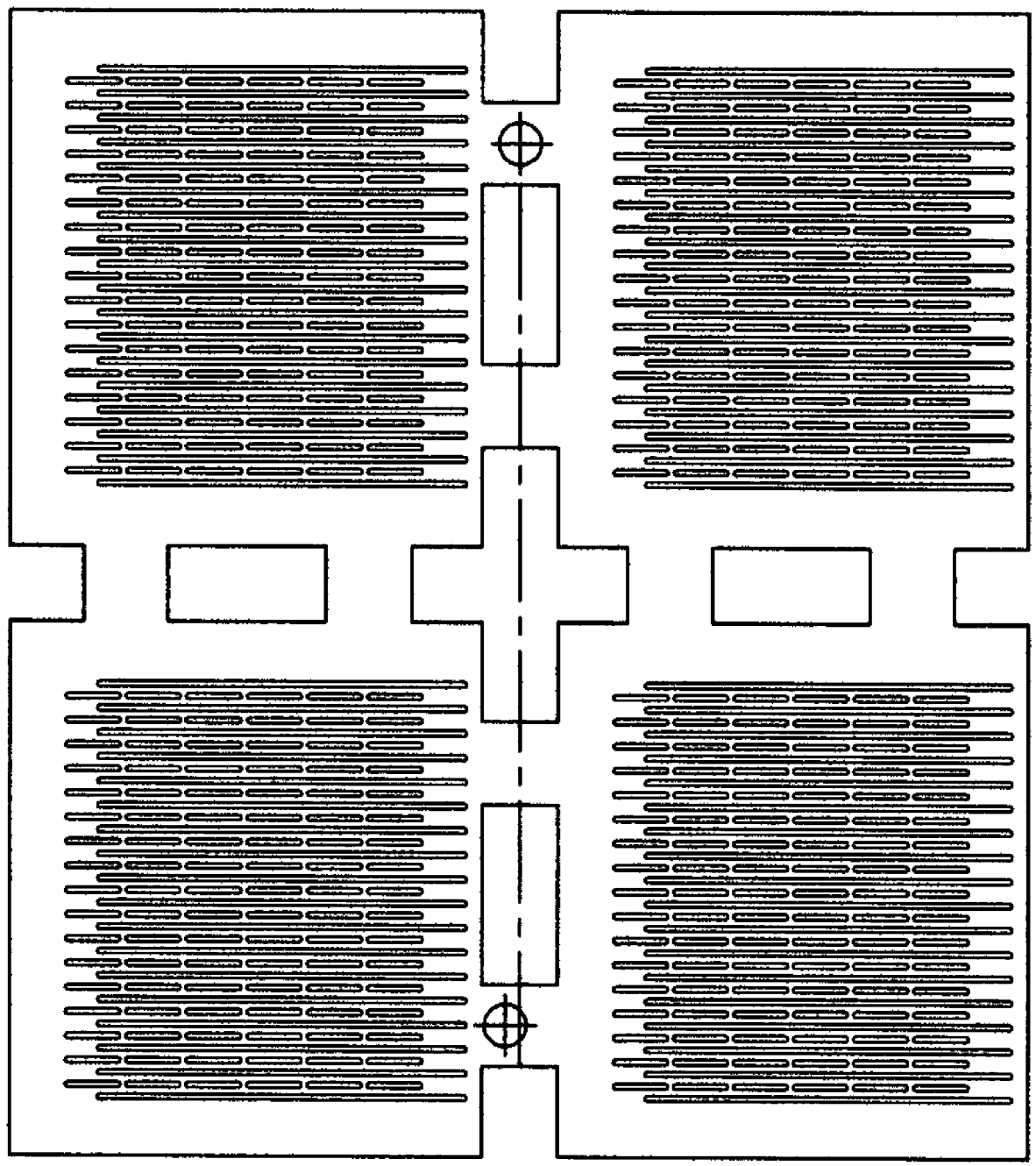
Figure 13:
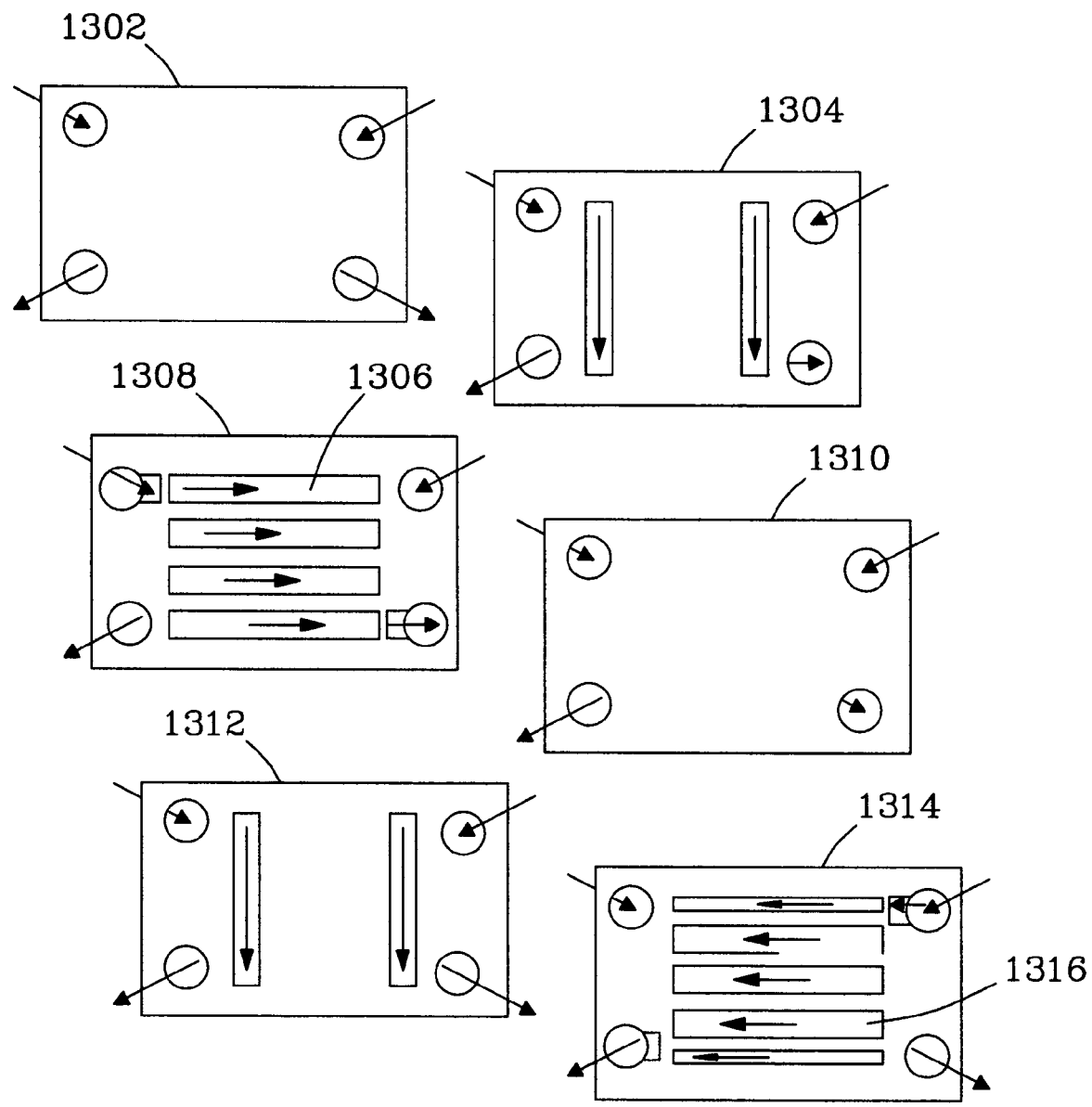
FIG. 13 illustrates a shim set for making a device for operating with fluids at different pressures.

An alternate microchannel design and construction orientation, sandwich style, can also be used to create an offsetting rib structure, shown in FIG. 13. This structure is similar to FIG. 10b that was made with the ortho style except that the ortho style can easily round the edges of the microchannels. The sandwich style microchannel described in FIG. 13 includes the use of 4 distinct shims stacked in repeating units of at least 6 shims.

The first shim 1302 represents a wall shim that either seprates the microchannel from the environment, from another microchannel, or from a speed bump shim used to connect channel flows to headers and footers.

The second shim 1304 in the stack is the speed bump shim that creates a flow passage way by joining the microchannels 1306 of fluid A in shim 1308 with the header or footer of shim 1302.

The third shim 1308 is the array of parallel microchannels through which fluid flows and a unit operation is performed. There may be alternately only one microchannel on this sheet.

The fourth shim 1310 in the stack is identical to shim 1302 and separates the fluid streams.

The fifth shim 1312 in the stack is identical to shim 1304. This shim creates a flow passage by joining the microchannels in the sixth shim with the inlet and outlet header/footer that would be next in the stack (and identical to shim 1302).

The sixth shim 1314 is the array of parallel microchannels 1316 through which fluid flows and a unit operation is performed. There may alternately only be one microchannel on the sheet 1314.

This shim design shown in FIG. 13 creates a pressure-resistant structure in which microchannels have staggered (rather than aligned) supports. This design option is less desirable in that rounded edges for each flow channel may not be achieved and thus thicker wall shims (shim 1302) may be required. It does however offer advantages of reducing the requirement to create small microfeatures in the shims as well as making the alignment of shims easier. Different applications may be optimized with different designs styles.

The invention includes devices having the one or more of the features illustrated in FIG. 13, as well as methods of making devices using shims with such features and methods of conducting unit operations using devices that include one or more of the illustrated design features.

Pressure Test Measurement for characterizing some preferred devices of the present invention.

Microchannel devices for unit operations, such as reaction, separation, heat exchange, vaporization, condensation and the like have been designed to operate with high interstream pressure differentials. The high pressure vaporizer of example 2 was operated with a differential pressure of 272 psig at over 210° C. for over 5000 hours.

Pressure Test

For a microchannel unit operation with at least one critical channel dimension less than about 2 mm, operate with at least two inlet fluid streams. The first fluid stream must be at 279° C. and 8 psig. The second fluid stream must be at 210° C. and 280 psig. Any flow rate may be used. Operate the device for 1000 hours during which there are 10 thermal cycles to ambient temperature of entire device. After 1000 hours operation, pressurize each fluid flow line to 50 psig and hold for 2 hours. The pressure must remain constant indicating minimal leak paths to the environment. Then, pressurize the second fluid flow line to 50 psig, leaving the first fluid flow line open to atmosphere, and hold for 2 hours. The pressure must remain constant indicating minimal internal leak paths. A minimal leak path is defined as a leak rate of less than $10^{-6}$ standard cubic centimeters per second of helium when helium is used as the fluid for the final leak test.

The invention also includes methods of conducting unit operations in the device having the pressure resistance characteristic described above.

We claim:

1. A process of making a device for conducting a unit operation comprising:

stacking a plurality of shims such that a continuous first flow path and a continuous second flow path are formed through the shims;

wherein the first and second flow paths are substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

wherein the plurality of shims comprises at least three adjacent shims through which the first flow path is formed and wherein a straight, unobstructed line is present through the first flow path in said at least three shims;

wherein the three shims are configured such that a unit operation can be performed on a fluid in the first flow path in which the straight, unobstructed line is present in said at least three adjacent shims; and bonding the shims to form the device capable of performing the unit operation on a fluid; and further comprising the steps of placing a first catalyst or sorbent in said first flow path and placing a second catalyst in the second flow path;

wherein the second catalyst is different than the first catalyst or sorbent.

2. A process, comprising:

stacking a plurality of shims such that a continuous flow path is formed through the shims;

wherein the flow path is substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

wherein the plurality of shims comprises at least three shims through which the flow path is formed and a straight, unobstructed line is present through the flow path in said at least three shims;

bonding the shims to form a device capable of performing a unit operation on a fluid;

passing the fluid into the device such that the fluid passes through the flow path in said at least three shims; and performing the unit operation on the fluid as it passes through the flow path in which the straight, unobstructed line is present in said at least three shims;

wherein the unit operation comprises distillation; and further comprising passing a second fluid through a second flow path in said at least three shims;

wherein the second flow path is substantially parallel to shim thickness and wherein the fluid in said flow path and the second fluid in said second flow path do not mix; and wherein the fluid in the second flow path is a heat exchange fluid.

3. A process, comprising:

stacking a plurality of shims such that a continuous flow path is formed through the shims;

wherein the flow path is substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

wherein the plurality of shims comprises at least three shims through which the flow path is formed and a straight, unobstructed line is present through the flow path in said at least three shims;

bonding the shims to form a device capable of performing a unit operation on a fluid;

passing the fluid into the device such that the fluid passes through the flow path in said at least three shims; and performing the unit operation on the fluid as it passes through the flow path in which the straight, unobstructed line is present in said at least three shims;

wherein the unit operation comprises separating;

further comprising passing a second fluid through a second flow path in said at least three shims;

wherein the second flow path is substantially parallel to shim thickness;

wherein the fluid in said flow path and the second fluid in said second flow path do not mix; and wherein the fluid in said flow path and the second fluid in said second flow path in said at least three shims are separated by a distance of 5 mm or less and wherein the pressure in said flow path and the second flow path differ by at least 1 atm.

4. The process of claim 3 wherein the flow path has rounded edges and wherein the pressure in said flow path and the second flow path differ by at least 10 atm.

5. The process of claim 3 wherein the fluid in said flow path and the second fluid in said second flow path in said at least three shims are separated by a distance of 1 mm or less and wherein the pressure in said flow path and the second flow path differ by at least 19 atm.

6. The process of claim 3 wherein the flow path comprises first supports that extend across the flow path, and the second flow path comprises second supports that extend across the second flow path; and wherein the first supports and the second supports are staggered.

7. A process, comprising:

stacking a plurality of shims such that a continuous flow path is formed through the shims;

wherein the flow path is substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

wherein the plurality of shims comprises at least three shims through which the flow path is formed and a straight, unobstructed line is present through the flow path in said at least three shims;

bonding the shims to form a device capable of performing a unit operation on a fluid;

passing the fluid into the device such that the fluid passes through the flow path in said at least three shims; and performing the unit operation on the fluid as it passes through the flow path in which the straight, unobstructed line is present in said at least three shims;

wherein the unit operation comprises separating;

further comprising passing a second fluid through a second flow path in said at least three shims;

wherein the second flow path is substantially parallel to shim thickness;

wherein the fluid in said flow path and the second fluid in said second flow path do not mix; and wherein the second fluid comprises a reaction composition;

wherein the reaction composition reacts exothermically.

8. A process, comprising:

stacking a plurality of shims such that a continuous first flow path and a continuous second flow path are formed through the shims;

wherein the first and second flow paths are substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

bonding the shims to form a device capable of performing a unit operation on a fluid;

passing a first fluid into the device such that the fluid passes through the first flow path in said plurality of shims; and performing at least one first unit operation on the fluid as it passes through the first flow path in said plurality of shims;

wherein the first unit operation is selected from the group consisting of distilling, adsorbing, separating, absorbing, and combinations of these;

passing a second fluid into the device such that the fluid passes through the second flow path in said plurality of shims; and performing at least one second unit operation on the fluid as it passes through the second flow path in said plurality of shims;

wherein the second unit operation comprises an exothermic reaction; and wherein the first and second unit operations are different;

wherein the plurality of shims comprises at least three shims through which the first flow path is formed and wherein a straight line can be drawn through the first flow path in said at least three shims; and wherein the second flow path contains a catalyst.

9. A process, comprising:

stacking a plurality of shims such that a continuous first flow path and a continuous second flow path are formed through the shims;

wherein the first and second flow paths are substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

bonding the shims to form a device capable of performing a unit operation on a fluid;

passing a first fluid into the device such that the fluid passes through the first flow path in said plurality of shims; and performing at least one first unit operation on the fluid as it passes through the first flow path in said plurality of shims;

wherein the first unit operation is selected from the group consisting of distilling, adsorbing, separating, absorbing, and combinations of these;

passing a second fluid into the device such that the fluid passes through the second flow path in said plurality of shims; and performing at least one second unit operation on the fluid as it passes through the second flow path in said plurality of shims;

wherein the second unit operation comprises reacting; and wherein the first and second unit operations are different;

wherein the plurality of shims comprises at least three shims through which the first flow path is formed and wherein a straight line can be drawn through the first flow path in said at least three shims; and wherein the second flow path contains a catalyst and an endothermic reaction is conducted in the second flow path.

10. A process, comprising:

stacking a plurality of shims such that a continuous microchannel flow path is formed through the shims;

wherein the microchannel flow path is substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

wherein the plurality of shims comprises at least three shims through which the microchannel flow path is formed and wherein the microchannel flow path in said at least three shims has a minimum dimension (height or width) of at least 10 μm;

bonding the shims to form a device capable of performing a unit operation on a fluid;

passing the fluid into the device such that the fluid passes through the microchannel flow path in said at least three shims; and performing the unit operation on the fluid as it passes through the microchannel flow path in which a straight, unobstructed line is present in said at least three shims;

wherein the microchannel flow path comprises a metal film on the edge of the flow path that is substantially parallel to shim thickness.

11. A process, comprising:

stacking a plurality of shims such that a continuous first flow path and a continuous second flow path are formed through the shims;

wherein the first and second flow paths are substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

bonding the shims to form a device capable of performing a unit operation on a fluid;

passing a first fluid into the device such that the fluid passes through the first flow path in said plurality of shims; and performing at least one first unit operation on the fluid as it passes through the first flow path in said plurality of shims;

wherein the first unit operation is selected from the group consisting of distilling, adsorbing, separating, absorbing, and combinations of these;

passing a second fluid into the device such that the fluid passes through the second flow path in said plurality of shims; and performing at least one second unit operation on the fluid as it passes through the second flow path in said plurality of shims;

wherein the second unit operation is selected from the group consisting of distilling, reacting, adsorbing, compressing, expanding, separating, absorbing, vaporizing, condensing, and combinations of these; and wherein the first and second unit operations are different;

wherein the plurality of shims comprises at least three shims through which the first flow path is formed and wherein a straight line can be drawn through the first flow path in said at least three shims; and wherein the first flow path comprises a metal film on the edge of the flow path.

12. A process, comprising:

stacking a plurality of shims such that a continuous first flow path and a continuous second flow path are formed through the shims;

wherein the first and second flow paths are substantially parallel to shim thickness;

wherein the term "substantially parallel to shim thickness" means substantially perpendicular to shim width and permits some curvature or minor, or partial deviation from 90° with respect to shim width, and furthermore, a flow path that travels perpendicular to shim thickness over the surface of a shim, through an opening in an adjacent shim, and down to the surface of another shim and again runs perpendicular to shim thickness is not "substantially parallel to shim thickness";

bonding the shims to form a device capable of performing a unit operation on a fluid;

passing a first fluid into the device such that the fluid passes through the first flow path in said plurality of shims; and performing at least one first unit operation on the fluid as it passes through the first flow path in said plurality of shims;

wherein the first unit operation is selected from the group consisting of distilling, adsorbing, separating, absorbing, and combinations of these;

passing a second fluid into the device such that the fluid passes through the second flow path in said plurality of shims; and performing at least one second unit operation on the fluid as it passes through the second flow path in said plurality of shims;

wherein the second unit operation comprises reacting; and wherein the first and second unit operations are different;

wherein the plurality of shims comprises at least three shims through which the first flow path is formed and wherein a straight line can be drawn through the first flow path in said at least three shims; and wherein the second flow path comprises a catalyst metal on an oxide support.

13. The process of claim 2 wherein the plurality of shims comprises at least five shims through which the flow path is formed and a straight, unobstructed line is present through the flow path in said at least five shims; and comprising passing the fluid into the device such that the fluid passes through the flow path in said at least five shims; and performing at least one unit operation on the fluid as it passes through the flow path in said at least five shims.

14. The process of claim 12 wherein the first flow path in said at least three shims does not connect with any other flow paths.

15. The process of claim 1 wherein the second catalyst is placed in the second flow path by wash coating.

16. The process of claim 7 wherein the plurality of shims comprising at least three adjacent shims through which the flow path is formed comprises at least five adjacent shims through which the flow path is formed and wherein a straight, unobstructed line is present through the flow path in said at least five shims.

17. The process of claim 2 wherein the plurality of shims comprising at least three adjacent shims through which the flow path is formed comprises at least five adjacent shims through which the flow path is formed and wherein a straight, unobstructed line is present through the flow path in said at least five shims.

* * * * *